US010437220B1

(12) United States Patent
Ochs et al.

(10) Patent No.: US 10,437,220 B1
(45) Date of Patent: Oct. 8, 2019

(54) DISTRIBUTED MACHINE COOPERATION IN ASSEMBLY

(71) Applicant: Otto Robotics Inc., Seattle, WA (US)

(72) Inventors: Garett Ochs, Seattle, WA (US); Colton Anderson, Seattle, WA (US); Kyu Han, Seattle, WA (US); Brian DeVitis, Seattle, WA (US); Kort Reinecke, Seattle, WA (US); Nick Wright, Seattle, WA (US); Derek Soike, Seattle, WA (US); James Mitchell Turner, Centerville, UT (US)

(73) Assignee: VIVID ROBOTICS, INC., Seattle, WA (US)

( * ) Notice: Subject to any disclaimer, the term of this patent is extended or adjusted under 35 U.S.C. 154(b) by 98 days.

(21) Appl. No.: 15/826,120

(22) Filed: Nov. 29, 2017

(51) Int. Cl.
  *G05B 19/05* (2006.01)
  *G05B 13/02* (2006.01)

(52) U.S. Cl.
  CPC ....... *G05B 19/054* (2013.01); *G05B 13/0265* (2013.01); *G05B 2219/1105* (2013.01); *G05B 2219/13144* (2013.01)

(58) Field of Classification Search
  CPC .............. G05B 19/054; G05B 13/0265; G05B 2219/1105; G05B 2219/13144
  See application file for complete search history.

(56) References Cited

U.S. PATENT DOCUMENTS

| | | | |
|---|---|---|---|
| 2006/0161664 A1* | 7/2006 | Motoyama | H04W 48/14 709/228 |
| 2010/0030373 A1* | 2/2010 | Lee | B65B 35/44 700/223 |
| 2013/0020871 A1* | 1/2013 | Takehara | H02J 3/14 307/32 |
| 2014/0052293 A1* | 2/2014 | Bruemmer | G05D 1/0088 700/248 |
| 2015/0005950 A1* | 1/2015 | Trench Roca | H04L 67/125 700/275 |
| 2015/0134279 A1 | 5/2015 | Kim et al. | |
| 2016/0104339 A1* | 4/2016 | Saccone, Jr. | G07F 13/00 700/232 |
| 2016/0231765 A1 | 8/2016 | Mose et al. | |
| 2016/0334774 A1 | 11/2016 | Nakamura | |
| 2017/0237254 A1* | 8/2017 | Meagher | H02J 3/00 700/291 |
| 2017/0277882 A1* | 9/2017 | Savolainen | G06F 21/43 |
| 2019/0056928 A1* | 2/2019 | Smal | B25J 9/08 |

* cited by examiner

*Primary Examiner* — Brian W Wathen
*Assistant Examiner* — Brian T McMenemy
(74) *Attorney, Agent, or Firm* — Cloutier Arnold Ortega PLLC

(57) ABSTRACT

A machine control system comprising one or more modules with non-transitory computer-readable storage medium to store configuration instructions, one or more of the one or more modules operating as a node to control the one or more modules, and the one or more modules orienting into a hierarchy of modules in response to receiving a system objective to produce an output from the system objective by determining a combined operating space of the one or more modules in the hierarchy of modules, selecting an action from the one or more actions in the combined operating space, sending a message to one or more modules to perform the action, and performing the action by activating the one or more components per the configuration instructions.

10 Claims, 15 Drawing Sheets

DISTRIBUTED MACHINE COOPERATION IN ASSEMBLY

BACKGROUND

Conventional assembly machines are structured in a centralized way to receive an input, follow a specific algorithm, and produce an output. Additionally, as each piece of the assembly is unaware of the capabilities of other pieces of the assembly, these assembly machines are not able to determine a more efficient way to process an input without modification.

BRIEF SUMMARY

The present system utilizes distributed computing among multiple modules to determine an algorithm to process an input to an output. As further inputs are received (as requests for outputs), the system modifies the algorithm to produce the multiple outputs. The modification may alter the previous process for the first input. The system thus learns new approaches to solving output problems. These processes are continuously updated and stored. The stored process may be stored locally or in a central location to inform other computing systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
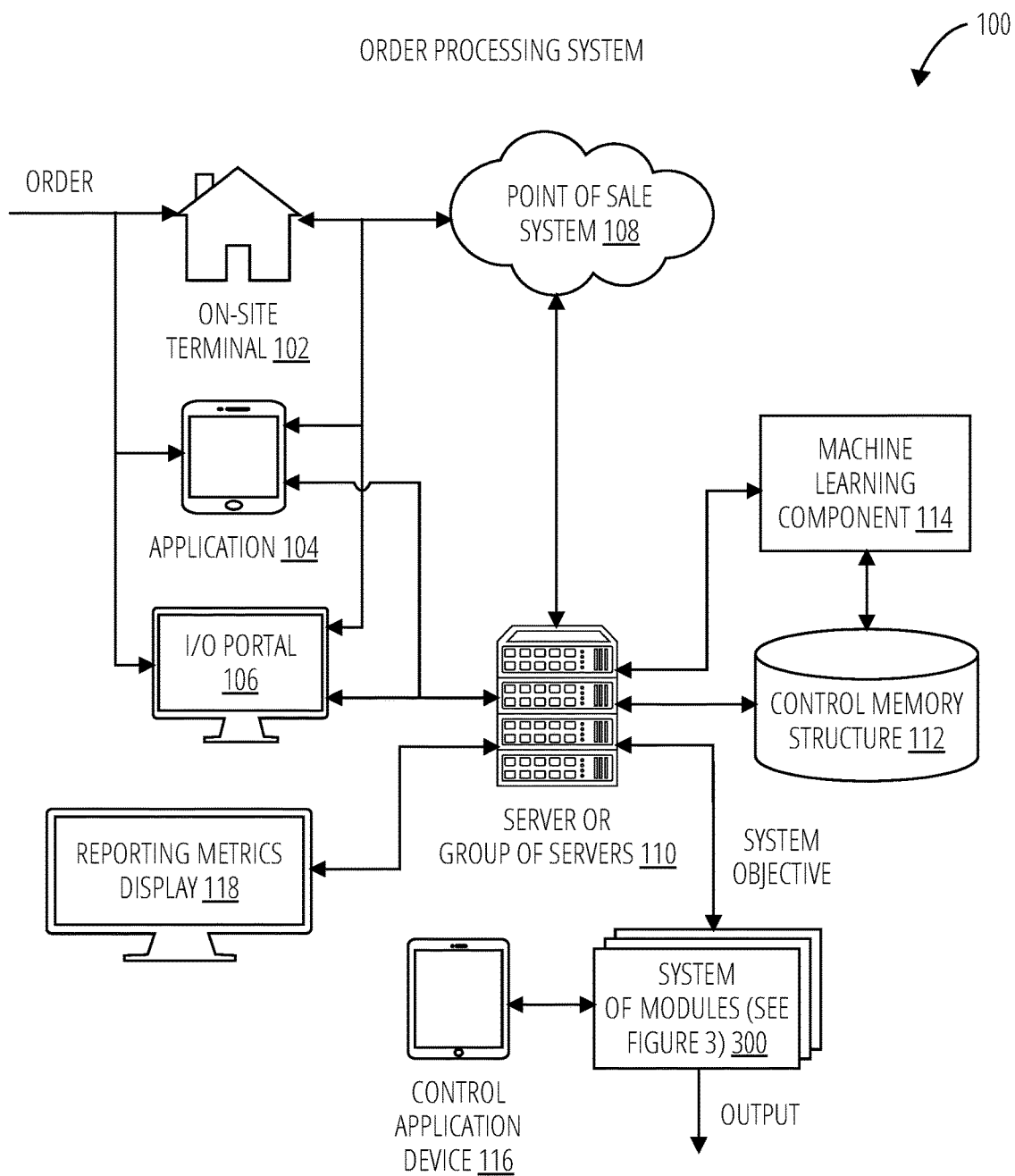
FIG. 1 illustrates an embodiment of an order processing system 100.

A module may comprise components. Each module may store configuration instructions, which may include core instructions, which may process module state, messages, errors, etc., and module-specific instructions, which enables a module to perform specific actions related to its components. Each module may exhibit spatial awareness of other modules utilizing sensors. For example, a soft potentiometer may be utilized that sends a message to another module in response to being activated. The sensors may also be utilized to calibrate the module, converging to a solution during a calibration process. The modules may send or receive communications with each other and a server system. The modules may also send and receive communications with other modules, nodes, servers, etc. For example, a module may have module-specific instructions to send operating characteristics, such as length of time to complete an action to a server, which may be receiving such communications from more than one module to determine efficiency of operations. The modules may utilize messages to communicate with each other and a server system. Each module may communicate utilizing websocket protocols with a secure handshake and defined incoming and outgoing messages. The interface protocols may use metadata of the module to communicate. Some modules may communicate uni-directionally (e.g., some sensors), whereas other modules may communicate bi-directionally. The module may also act to alter or amplify the message. A module may also communicate periodically. In some embodiments, a module may communicate with another module or component pneumatically. Modules may be utilized that have similar components capable of performing similar actions. Therefore, in some cases, one module may perform the actions of another module. In response to performing some actions, a module may create and store a lookup table regarding that process, which may be sent to the server system. Each module may operate to minimize power consumption by its components. For example, a module that slices cheese in a food assembly line may determine the energy consumed by a motor to slice the cheese for various amounts of cheese, creating a lookup table. The module may then send a signal to the server system to refill the cheese to maintain the amount of cheese in an operating band that minimizes power consumption. Some modules may be utilized as nodes.

Component may include motor controllers, power receiver/supplies, logic stored in memory, sensors, actuators, transducers, communication receivers, communication transmitters, antennas, amplifiers, etc.

Nodes may be capable of interfacing with more than one module (i.e., other than itself), may have bi-directional dataflow, and may be identified by an order, which may be determined by number of other nodes "below" in a hierarchy of nodes. While a specific module may be utilized as a node, that module may not, in some configurations or hierarchy of modules, be utilized as a node. A module may be selected to be a node to minimize or maximize the communication channels, number of communications, etc. to perform a system objective. A module may be selected as a node or de-selected based on the other modules, the system objective, multiple system objectives (e.g., combined system objective), etc. A module may be selected to be a node based on weighted factors, including the system objectives, the other modules in the machine control system, the operating space of each of the modules, and the combined operating space. In some embodiments, the module utilized as a node is determined by the server system. During some operations of the machine control system, such as calibration or other task that utilize an increase number of communications, the machine control system may utilize more nodes in a hierarchy of modules than during other operations. In some embodiments, the modules that are not nodes do not communicate with each other; communication is performed via a common nodes. In other embodiments, some communication is performed between modules that are not nodes, which may be limited to specific message types determined by a pre-loaded program, a node, or instructions from a server system, such as sending and receiving collaborative data or operating information.

A functioning module is a module that is able to perform the tasks associated with its configuration instructions.

A mod is a component that may be added (e.g., attached to) to a module or component of a module and may be utilized for many functions, including temperature control, storing additional assembly material, etc.

A work-in-progress is a collection of one or more assembly materials. The work-in-progress results from the actions of the modules under the influence of a system objective.

Referring to FIG. 1, the order processing system 100 comprises an on-site terminal 102, an application 104, a website portal 106, a point of sale system 108, a server system 110, a control memory structure 112, a machine learning component 114, a control application device 116, a reporting metrics display 118, and a machine control system 300.

The on-site terminal 102 is configured to receive an order. The order may be received via haptic input via a touch screen, audible input to an audio receiver, an optical input via an optical receiver, etc. In response to receiving an order, the on-site terminal 102 sends the order to the point of sale system 108 that is associated with the on-site terminal 102. One or more on-site terminal 102 may be associated with a point of sale system 108. The on-site terminal 102 may also receive an input from the point of sale system 108. The input may comprise a list of orders, queries regarding an order, instructions to operate the on-site terminal 102, etc.

The application 104 is configured to receive an order. The order may be received via haptic input via a touch screen, audible input to an audio receiver, an optical input via an optical receiver, etc. The application 104 may be configuration instructions stored on a device that operate the device according to inputs received. In response to receiving an order, the application 104 sends the order to the point of sale system 108 that is associated with the application 104 or to the server system 110. The selection of sending to the point of sale system 108 or the server system 110 may be based on the order received and/or the configuration of the application 104. One or more application 104 may be associated with each point of sale system 108 or server system 110. The application 104 may also receive an input from the point of sale system 108 or the server system 110. The input may comprise a list of orders, queries regarding an order, instructions to operate the application 104, etc.

The website portal 106 is configured to receive an order. The order may be received via haptic input via a touch screen, audible input to an audio receiver, an optical input via an optical receiver, etc. In response to receiving an order, the website portal 106 sends the order to the point of sale system 108 that is associated with the application 104 or to the server system 110. The selection of sending to the point of sale system 108 or the server system 110 may be based on the order received and/or the configuration of the application 104. One or more website portal 106 may be associated with each point of sale system 108 or server system 110. The website portal 106 may also receive an input from the point of sale system 108 or the server system 110. The input may comprise a list of orders, queries regarding an order, instructions to operate the website portal 106, etc.

The point of sale system 108 receives an order from the on-site terminal 102, the application 104, or the website portal 106. In response, the order may be sent to the server system 110, which may comprise one or more servers associated with the point of sale system 108. Multiple point of sale system 108 may be utilized, each associated with one or more of the on-site terminal 102, the application 104, and or the website portal 106. The point of sale system 108 may also receive an input from the server system 110. The input may comprise a list of orders, queries regarding an order, instructions to alter the operation of the point of sale system 108, etc. The input may also comprise information regarding an order received by the server system 110 from the application 104 or the website portal 106. The point of sale system 108 may utilize cloud-computing services.

Figure 2:
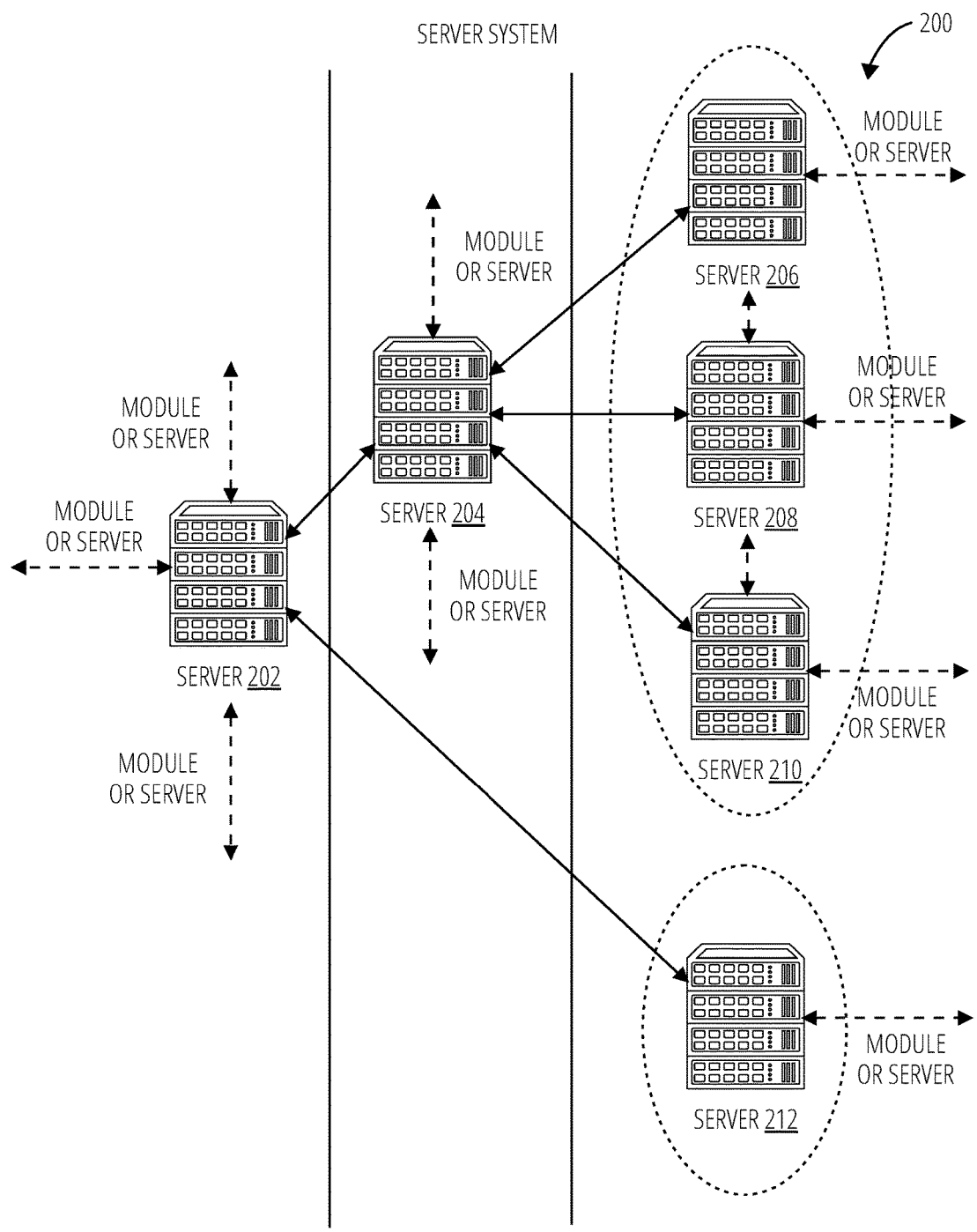
FIG. 2 illustrates an embodiment of a server system 200.

The server system 110 receives orders from the application 104, the website portal 106, and the point of sale system 108. The server system 110 may include one or more servers. The one or more servers may be configured to communicate in a hierarchical structure. An exemplary server system is depicted in FIG. 2. Each server may be associated with one or more of the on-site terminal 102, the application 104, the website portal 106, or the point of sale system 108. The server system 110 transforms the order into a system objective and sends the system objective to the machine control system 300. The server system 110 may also send operation controls (e.g., configuration instructions, including core instructions and module-specific instructions) to the machine control system 300. The server system 110 may provide a secure handshake with the machine control system 300 with defined incoming and outgoing messages utilizing websocket protocols. As the machine control system 300 may comprise one or more modules, the server system 110 may select a module to which to send the system objective. The selection may be altered by the source of the order and the server in the server system 110 operating to select the module. The server system 110 may receive information from the machine control system 300, which may include operating information, error control signals, system objective completion signals, material replacement signals, module operation sequence, number of communication, etc. The server system 110 sends information to and receives information from the control memory structure 112. The information may include system objectives, operation controls, core instructions, module-specific instructions, the associated company or individual, the order selection, the order source, time of the order, time of the order completion, whether an error control signal was received, which modules were operated, module operation sequence, whether multiple system objectives (as a combined system objective) were being processed by a node. The server system 110 may send a control signal to the machine learning component 114 to configure the machine learning component 114 to operate on the information stored in the control memory structure 112. The control may provide instructions to operate on a portion of the control memory structure 112. The server system 110 may send a control signal to the reporting metrics display 118, which may provide instructions to display the reporting metrics display 118 on a machine display and instructions to operate the machine display to receive inputs and send outputs to the server system 110. The metrics may be for a specific company, order, or may be for the entire system. The server system 110 may utilize cloud-computing services.

The control memory structure 112 may send information to and receive information from the server system 110 and the machine learning component 114. The information may include the system objectives, core instructions, module-specific instructions, the operation controls, the associated company or individual, the order selection, the order source, time of the order, time of the order completion, whether an error control signal was received, which modules were operated, module operation sequence, whether multiple system objectives (i.e., as a combined system objective) were being processed by a node. The control memory structure 112 may comprise multiple structures associated with one or more accounts associated with an order source. The control memory structure 112 may be a repository for system objectives and the server system 110 may select the system objective from the control memory structure 112 in response to receiving an order.

The machine learning component 114 may receive a control signal to operate on the control memory structure 112. In response, the machine learning component 114 may send a control signal to the control memory structure 112 to send the information to the machine learning component 114. After receiving the information and operating according to the configuration associated with the control signal received, the machine learning component 114 sends an output to the server system 110. The machine learning component 114 may be utilized to determine the system objectives, operation controls, core instructions, module-specific instructions, supply chain management, optimal module sequences for a specific system objective, failure frequency of modules, an optimal node module(s) for a group of one or more modules, etc. The machine learning component 114 may send the analyzed information to the control memory structure 112 to be stored.

The control application device 116 may be utilized to interact with the machine control system 300. The control application device 116 may retrieve operating information, override operations of the machine control system 300, retrieve current states of a work in progress, retrieve planned states of the work in progress, etc. The control application device 116 may be operated on a device that may receive haptic inputs, audio inputs, visual inputs, etc. and display controls that when activate perform the above functions. In some embodiments, the control application device 116 has read/write capability or partial read/write capability. The control application device 116 may also be read-only or write-only (or partial of either).

The reporting metrics display 118 may display the stored information from the control memory structure 112 received via the server system 110. The reporting metrics display 118 may process the stored information prior to displaying the reporting metrics display 118. The reporting metrics display 118 may include operations of the machine control system 300. The reporting metrics display 118 may display controls utilized to alter the display, including which information to display. The displayed information may be specific to an account, group of one or more modules, or the entire system.

The machine control system 300 may receive the system objective, operation controls, core instructions, and module-specific instructions from the server system 110. The machine control system 300 may also receive controls, such as an operation override or a request for information from the control application device 116. The machine control system 300 may send the requested information to the control application device 116. The machine control system 300 may also send controls to the server system 110, including a request for configuration instructions, error control signals, system objective completion signals, material replacement signals, module operation sequence, number of communication, etc. The machine control system 300 utilizes the system objective and the operation controls to transform the system objective and materials into the output. Multiple machine control system 300 may be utilized to perform a system objective. The system objective determines an end state for a machine group of the machine control system 300 to achieve based on their initial configuration and ability to utilize sensors, actuators, and other components to achieve different configurations (i.e., operating space). The machine control system 300 is described in further detail in FIG. 3.

Figure 7:
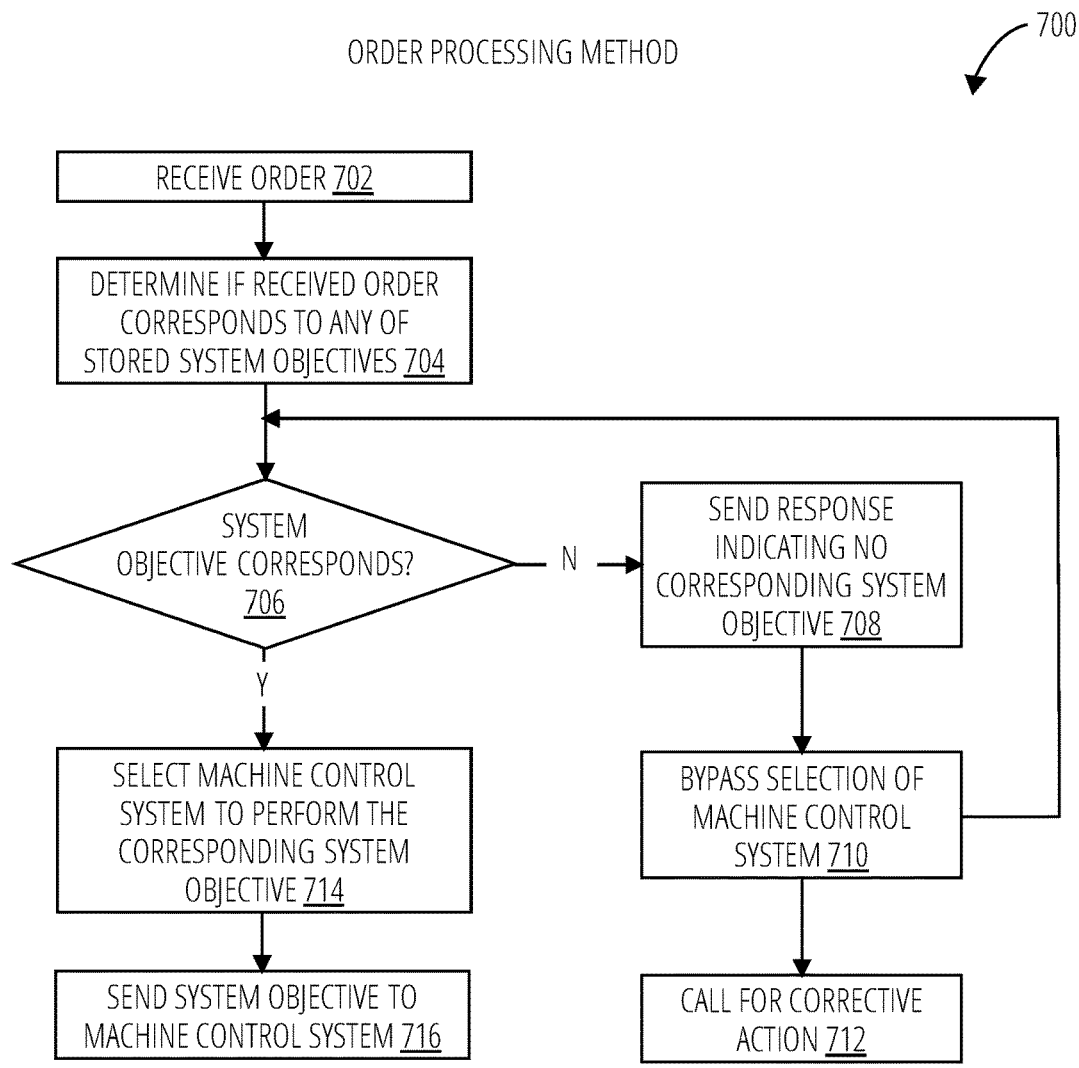
FIG. 7 illustrates an embodiment of an order processing method 700.

The order processing system 100 may be operated in accordance with the process depicted in FIG. 7.

Referring to FIG. 2, the server system 200 comprises a lead server 202, a first entity coordinating server 204, a first entity server 206, a first entity server 208, a first entity server 210, and a second entity server 212.

The lead server 202 is associated with both the first entity and the second entity. The lead server 202 may be associated with other entities, such as other servers or modules. The first entity coordinating server 204, the first entity server 206, the first entity server 208, and the first entity server 210 are associated with the first entity. The first entity coordinating server 204, the first entity server 206, and the first entity server 208 may be associated with other entities, such as other servers and modules. The second entity server 212 is associated with the second entity. The second entity server 212 may be associated with other entities, such as other servers and modules. A client may be associated with one or more entities.

The lead server 202 send communications to and receive communications from the first entity coordinating server 204 and the second entity server 212. The communications may direct the first entity coordinating server 204 and the second entity server 212 to perform a specific action. For example, the lead server 202 may receive an order associated with the first entity or the second entity. The lead server 202 may then send the order to the first entity coordinating server 204 or the second entity server 212, respectively. The first entity coordinating server 204 or second entity server 212 may then transform the order into a system objective. The lead server 202 may also receive communications from the first entity coordinating server 204 and the second entity server 212. For example, the lead server 202 may receive a communication from the first entity coordinating server 204 and the second entity server 212 regarding operations performed in response to similar system objectives sent by the first entity coordinating server 204 and the second entity server 212. The lead server 202 may then store this information in a control memory structure and have a machine learning component determine whether the operational performance differs between entities. In some embodiments, the lead server 202 may send a system objective, operation controls, core instructions, or module-specific instructions to machine control systems. The lead server 202 may also communicate with one or more other servers and modules.

The first entity coordinating server 204 send communications to and receive communications from the lead server 202 and the first entity server 206, the first entity server 208, and the first entity server 210. For example, the first entity coordinating server 204 may receive an order from the lead server 202 and select one of the first entity server 206, the first entity server 208, or the first entity server 210 to which to send the order to for the selected server to transform into a system objective. In some embodiments, the first entity coordinating server 204 may send a system objective, operation controls, core instructions, or module-specific instructions to machine control systems. The first entity coordinating server 204 may also communicate with one or more other servers and modules.

The first entity server 206, the first entity server 208, and the first entity server 210 send communications to and receive communications from the first entity coordinating server 204. The first entity server 206, the first entity server 208, and the first entity server 210 may send a system objective, operation controls, core instructions, or module-specific instructions to machine control systems. The first entity server 206, the first entity server 208, and the first entity server 210 may also communicate with one or more other servers and modules.

The second entity server 212 sends communications to and receives communications from the lead server 202. The second entity server 212 may send a system objective, operation controls, core instructions, or module-specific instructions to machine control systems. The second entity server 212 may also communicate with one or more other servers and modules.

Figure 3:
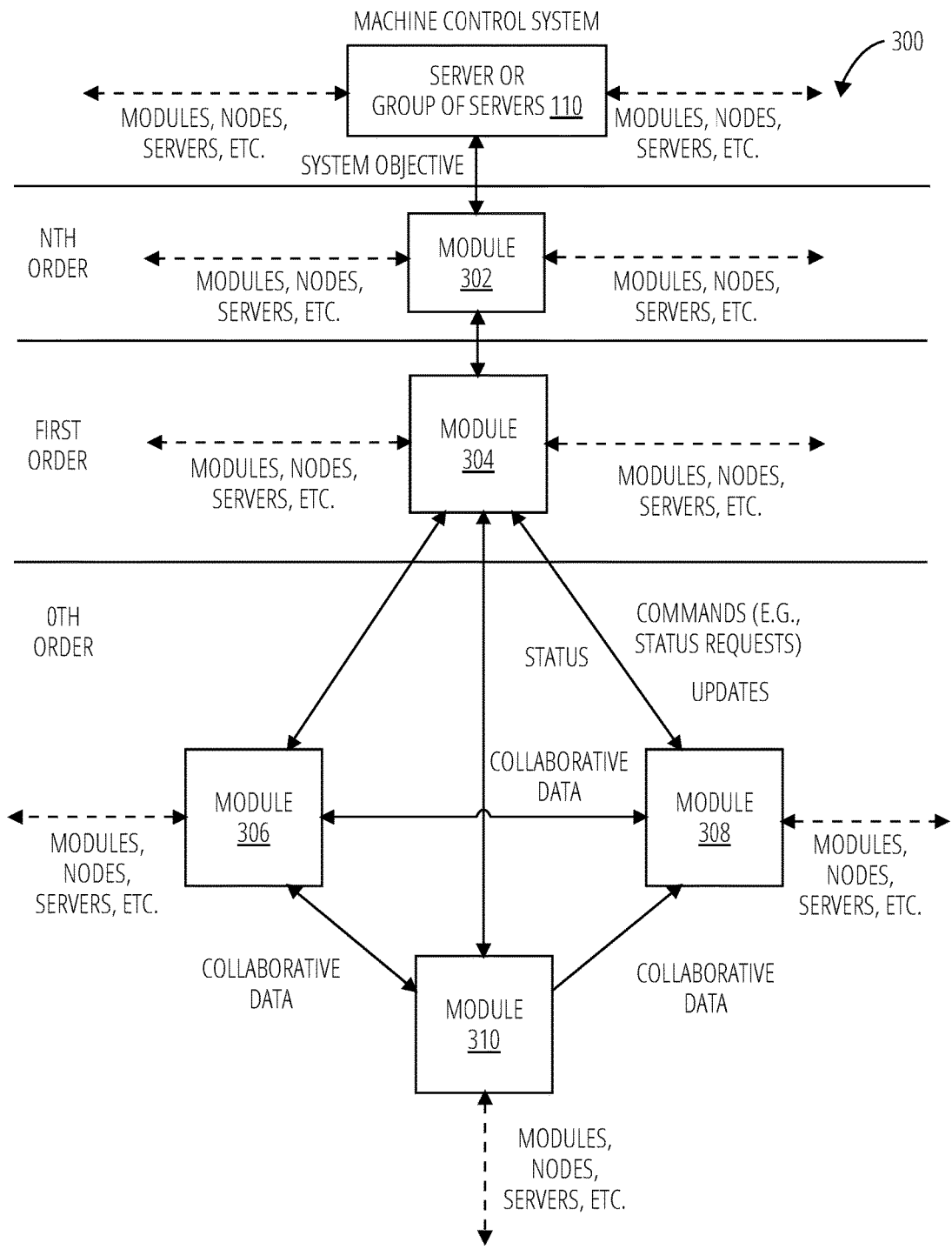
FIG. 3 illustrates an embodiment of a machine control system 300.

Referring to FIG. 3, the machine control system 300 comprises a server system 110, a module 302, a module 304, a module 306, a module 308, and a module 310.

The server system 110 operates in accordance with FIG. 1 above. The server system 110 may select the module 302 among a plurality of modules to send a system objective.

Each of the module 302, the module 304, the module 306, the module 308, and the module 310 may comprise components including motor controllers, power receiver/supplies, logic stored in non-transitory computer-readable storage medium, sensors, actuators, transducers, communication receivers, communication transmitters, antennas, amplifiers, etc. Each module may store configuration instructions, which may include core instructions, which may process module state, messages, errors, etc., and module-specific instructions, which enables a module to perform specific actions related to its components. Each module may exhibit spatial awareness of other modules utilizing sensors. For example, a soft potentiometer may be utilized that sends a message to another module in response to being activated. The sensors may also be utilized to calibrate the module, converging to a solution during a calibration process. The modules may send or receive communications with each other and a server system. The modules may also send and receive communications with other modules, nodes, servers, etc. For example, a module may have module-specific instructions to send operating characteristics, such as length of time to complete an action to a server, which may be receiving such communications from more than one module to determine efficiency of operations. The modules may utilize messages to communicate with each other and a server system. Each module may communicate utilizing websocket protocols with a secure handshake and defined incoming and outgoing messages. The interface protocols may use metadata of the module to communicate. Some modules may communicate uni-directionally (e.g., some sensors), whereas other modules may communicate bi-directionally. The module may also act to alter or amplify the message. A module may also communicate periodically. In some embodiments, a module may communicate with another module or component pneumatically. Modules may be utilized that have similar components capable of performing similar actions. Therefore, in some cases, one module may perform the actions of another module. In response to performing some actions, a module may create and store a lookup table regarding that process, which may be sent to the server system. Each module may operate to minimize power consumption by its components. For example, a module that slices cheese in a food assembly line may determine the energy consumed by a motor to slice the cheese for various amounts of cheese, creating a lookup table. The module may then send a signal to the server system to refill the cheese to maintain the amount of cheese in an operating band that minimizes power consumption.

Some modules may be utilized as nodes. Nodes may be capable of interfacing with more than one module (i.e., other than itself), may have bi-directional dataflow, and may be identified by an order, which may be determined by number of other nodes "below" in a hierarchy of nodes. While a specific module may be utilized as a node, that module may not, in some configurations or hierarchy of modules, be utilized as a node. A module may be selected to be a node to minimize or maximize the communication channels, number of communications, etc. to perform a system objective. A module may be selected as a node or de-selected based on the other modules, the system objective, multiple system objectives (e.g., combined system objective), etc. A module may be selected to be a node based on weighted factors, including the system objectives, the other modules in the machine control system, the operating space of each of the modules, and the combined operating space. In some embodiments, the module utilized as a node is determined by the server system. During some operations of the machine control system, such as calibration or other task that utilize an increase number of communications, the machine control system may utilize more nodes in a hierarchy of modules than during other operations. In some embodiments, the modules that are not nodes do not communicate with each other; communication is performed via a common nodes. In other embodiments, some communication is performed between modules that are not nodes, which may be limited to specific message types determined by a pre-loaded program, a node, or instructions from a server system, such as sending and receiving collaborative data or operating information.

The module 302 receives the system objective from the server system 110. The module 302 may also receive configuration instructions to perform the system objective from the server system or the configuration instructions may be pre-programmed in the non-transitory computer-readable storage medium of the module 302. The configuration instructions may comprise core instructions and module-specific instructions. The module 302 may receive updates from the server system for the configuration instructions. The module 302 may send a request for configuration instructions, error control signals, system objective completion signals, material replacement signals, module operation sequence, number of communication, etc. to the server system 200. The module 302 sends the system objective to the module 304. The module 302 may select the module 304 among a plurality of modules. The module 302 may also communicate with other modules and nodes. For example, if the module 302 does not receive a status signal from the module 304 after a pre-determined period, the module 302 may send a message to another first order node, instructing that first order node to communicate with the module 304, the module 306, the module 308, or the module 310. The module 302 may also communicate with the module 306, the module 308, or the module 310 if capable of being a node to perform the configuration instructions, selecting that module to be a node. The module 302 may also perform actions associated with the execution of the system objective. For example, the module 302 may be embodied as a circular saw at a construction site. In addition to sending messages to other modules to place a beam to be cut, the module 302 may activate an actuator to cut the beam.

The module 304 is depicted as a first order node that sends and receives messages from the module 302 (a higher nth order node) and the module 306, the module 308, and the module 310. The module 304 may be selected from among the module 304, the module 306, the module 308, and the module 310 to be a node to minimize communication channels and number of the messages utilized to perform the system objective. The module 304 may send error control signals, system objective completion signals, material replacement signals, module operation sequence, number of communication, etc. to the module 302. The module 304 may send commands (e.g., status requests and requests to perform an action), configuration instructions, and updates to the module 306, the module 308, and the module 310. The module 304 may receive the system objective from the module 302 and configuration instructions to perform the system objective. The configuration instructions may comprise binned inputs, which comprise a one or more sequences of actions performed by modules to achieve a series of machine states resulting in the completion of all of part of the system objective. The module 304 may send a message to the module 302 to provide the configuration instructions for a system objective if the module 304 does not have those configuration instructions. The module 302 may then provide those configuration instructions, request those configuration instructions from the server system 110, or send a message to another module to send the configuration instructions to the module 304. The module 304 may alter the commands sent to the module 306, the module 308, and the module 310 based on other system objectives in progress and current operating space of those modules. The module 304 synchronizes the actions of each of the modules (i.e., the module 306, the module 308, and the module 310) utilizing message communications. The module 304 may also store configuration instructions for specific modules, such that if an additional module is added or replaced, the module 304 may send the configuration instructions to the additional module. Upon detecting an additional module, the module 304 may determine the operating space of the additional module and send the associated configuration instructions. The configuration instructions may be distributed among a plurality of modules. In some embodiments, each module that is part of a group of modules (i.e., the module 304, the module 306, the module 308, and the module 310) may store all or a portion of the configuration instructions for one of more system objectives, such that an additional module may assemble the configuration instructions from multiple sources. The portion of configuration instructions stored on each module may depend on the number of modules, the likelihood of an additional module being added, and the failure rate of each of the modules. Utilizing this system, a group of modules may replicate the machine control system if at least one module remains.

The module 306, the module 308, and the module 310 receive messages from the module 304, performs an action associated with the message, and responds to the module 304. Each module may receive and store core instructions and module-specific instructions (i.e., configuration instructions). When a module is determined to be an additional module, the module 304 may send the configuration instructions to the additional module. The sent configuration instructions may be based on the components and operating space of the additional module. Additionally, the additional module may retrieve the module-specific instructions from each of the other modules, or may be receive an update from the server system. The module 306, the module 308, and the module 310 may send message to each other, including collaborative data or operating information, which may include configuration instructions or recorded data pertaining to operation of each module. This operating information may be distributed and stored prior to being sent to the server system 110 (e.g., via the module 304 and the module 302). This may reduce the number of communications with the server system 110.

The machine control system 300 may be operated in accordance with the processes depicted in FIG. 8, FIG. 9, FIG. 10, FIG. 11, FIG. 12, FIG. 13, and FIG. 14.

Figure 4:
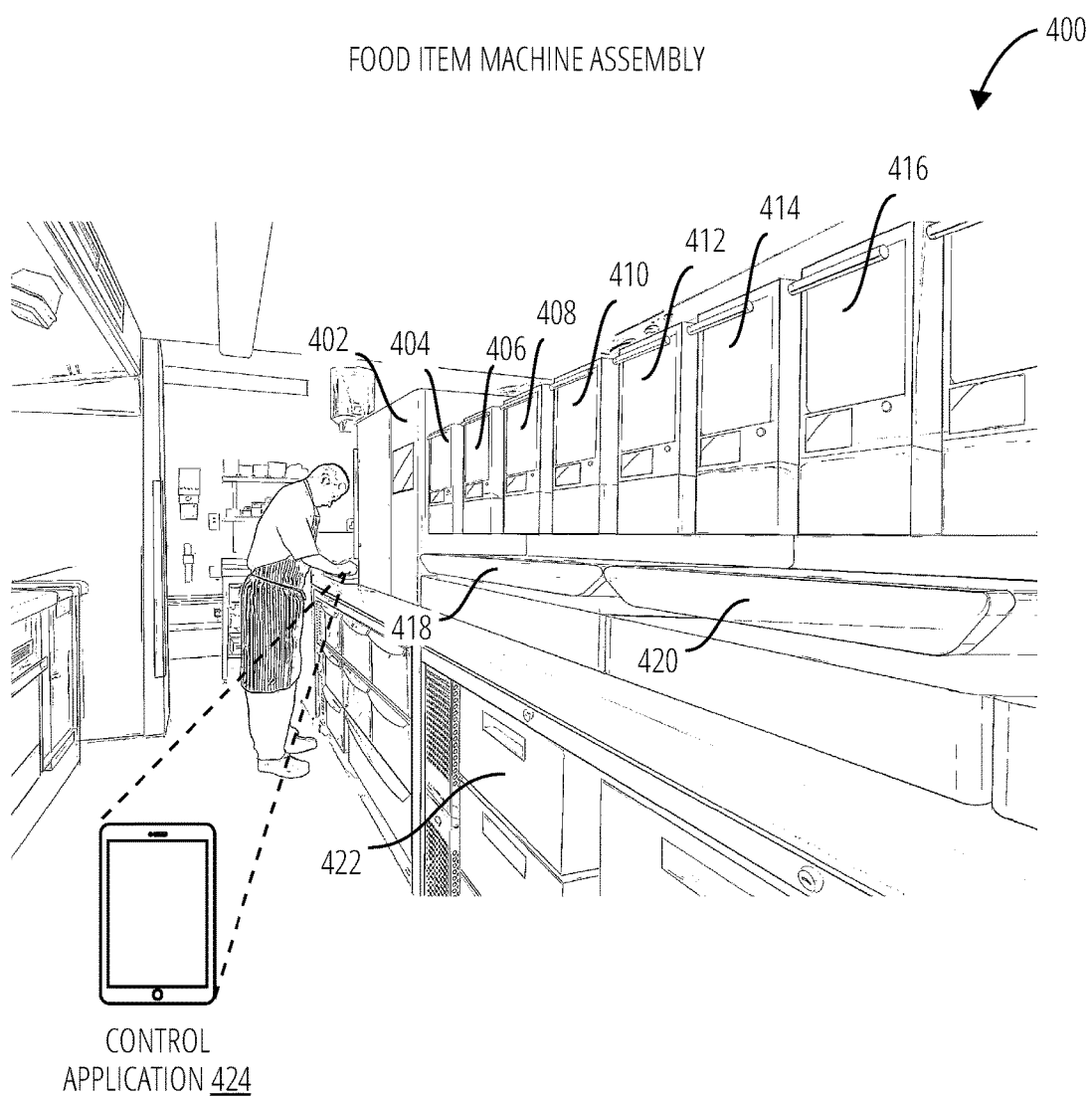
FIG. 4 illustrates an embodiment of a food item machine assembly 400.

Referring to FIG. 4, the food item machine assembly 400 comprises a first food dispenser 402, a second food dispenser 404, a third food dispenser 406, a fourth food dispenser 408, a fifth food dispenser 410, a sixth food dispenser 412, a first broiling oven 414, a second broiling oven 416, a first food conveyor 418, a second food conveyor 420, an oven 422, and a control application 424.

The food item machine assembly 400 may operate as a machine control system. Each dispenser, oven, and conveyor may be a module in the machine control system as described in FIG. 3. One or more of the modules may be selected to be a node. For example, in one embodiment, the first food conveyor 418 may be a first level node that communicates with the server system and controls the actions of the other modules in a hierarchy of modules to complete a system objective or other task provided by the server system. In another embodiment, the first food conveyor 418 may be a second level node and the first food dispenser 402 may be a first level node in a hierarchy of modules. The first food conveyor 418 may communicate with the ovens and other conveyor (i.e., the first broiling oven 414, the second broiling oven 416, the second food conveyor 420, and the oven 422) to controls the actions of those modules and itself, while also controlling the actions of the first food dispenser 402, which further controls the actions of the food dispensers (i.e., the second food dispenser 404, the third food dispenser 406, the fourth food dispenser 408, the fifth food dispenser 410, and the sixth food dispenser 412).

The first food dispenser 402, the second food dispenser 404, the third food dispenser 406, the fourth food dispenser 408, the fifth food dispenser 410, and the sixth food dispenser 412 are each configured to dispense a type of food or food topping. Each dispenser may dispense the same or a different food or food topping. For example, the first food dispenser 402 may dispense cheese, the second food dispenser 404 may dispense pepperoni, and the third food dispenser 406 may dispense cheese. Each dispenser may also vary in operating space based on the components utilized. For example, while the first food dispenser 402 and the third food dispenser 406 both dispense cheese, the first food dispenser 402 may comprise a component that may be utilized for shredding, while the third food dispenser 406 may comprise a component that may be utilized for grating. Thus, the resulting food or food topping may be different for the same assembly material. Each dispenser may also be able to detect the components that comprise the dispenser to communicate its operating space to the machine control system to receive module-specific instructions. Each dispenser may receive a control signal from a node in the machine control system to dispense the food assembly material. The dispensers may also comprise sensors and actuators to detect the presence of a work in progress (i.e., a collection of food items) and operate its components. Upon detection of a work in progress, the dispenser may send a control signal to the node in the machine control system.

Each dispenser may be replaced by another dispenser. Upon being placed in the food item machine assembly 400, the added dispenser may communicate with a node in the machine control system to notify the machine control system of its location, components, and operating space. The dispenser may then receive operating configuration instructions if not already pre-programmed in its non-transitory computer-readable storage medium, which may be provided by the server system, the node, or another module. Each dispenser may also auto-calibrate. For example, a sauce dispenser may determine the appropriate motor control to dispense its sauce at various temperatures, which may be determined by a component that measures temperature. This information may then be stored in a lookup table. The information may be further distributed among the modules of the food item machine assembly 400 or sent to a server system.

The first broiling oven 414, the second broiling oven 416, and the oven 422 may be a collection of components including sensors, actuators, heating elements, etc. to detect the presence of a work-in-progress, provide energy input to cook the work-in-progress, and notify the node when the operation is complete.

The first food conveyor 418 and the second food conveyor 420 may be a collection of components including sensors, actuators, etc., to detect a work in progress, to move the work in progress, and to communicate to the node the location of a work-in-progress. The actuators may be configured to provide movement in multiple directions and each conveyor may be comprised of separate component conveyors to move multiple works-in-progress in different directions at the same time. The conveyors may also comprise a belt tensioner and belt drive, which may operate with open loop control.

The control application 424 configure a device to send and receive communications with the server system, the node, and the modules. The control application 424 may configure a display of the current system objective or combined system objective and the progress to completion. The control application 424 may also provide a notification, such as an audible alert, text, etc. in response to a detection of an error in the operation of a module, or for a user to perform an action outside the operating space of the machine control system. For example, the node (such as the first food conveyor 418) may send a message to the control application 424 to notify a user that a work in progress is to be transferred from the second food conveyor 420 to the oven 422. In an embodiment that includes a mobile fork lift module that may operate to move works-in-progress from the first food conveyor 418 or the second food conveyor 420 to the first broiling oven 414, the second broiling oven 416, or the oven 422, a message may not be sent to the control application 424 to provide a notification. The control application 424 may also configure the device to receive an input to alter the operation of the machine control system.

Figure 5:
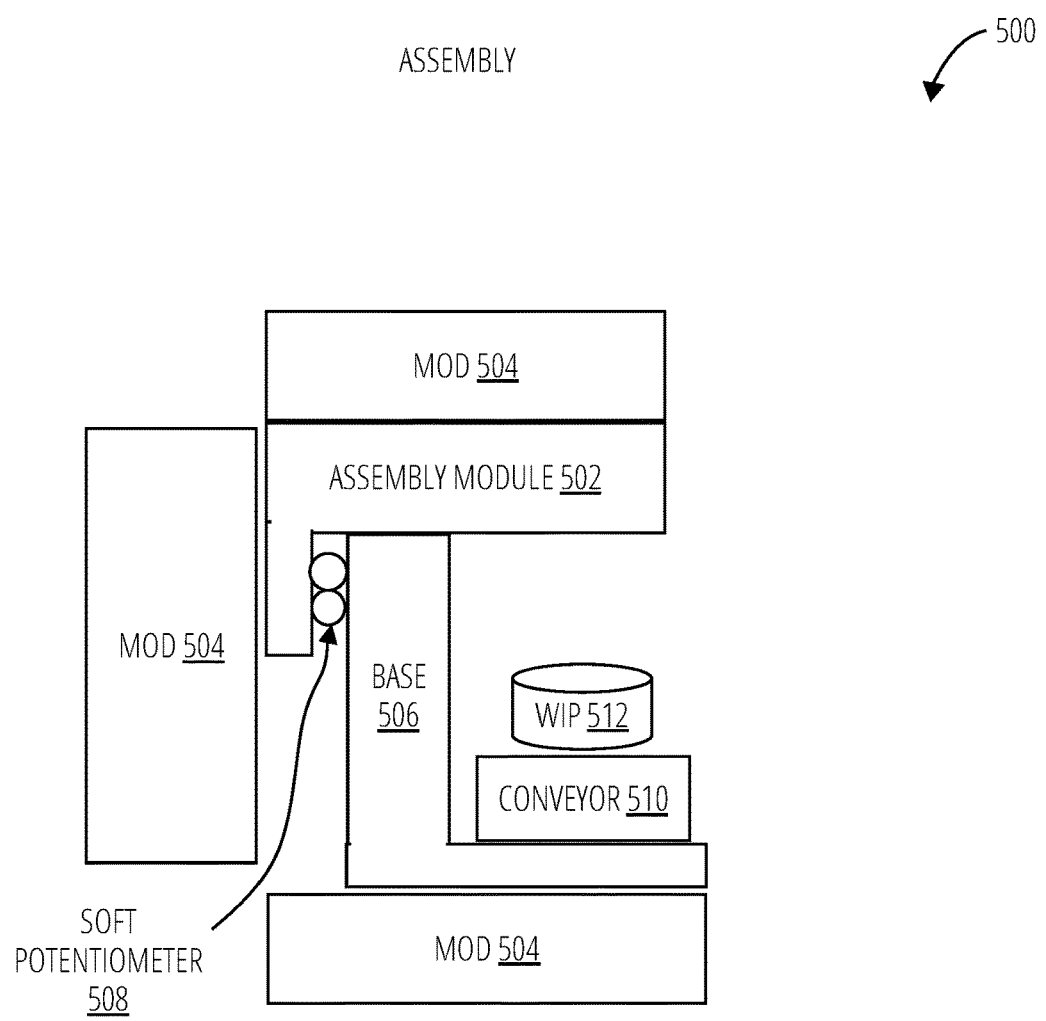
FIG. 5 illustrates an embodiment of an assembly 500.

Referring to FIG. 5, the assembly 500 comprises an assembly module 502, a one or more mods 504, a base module 506, a conveyor module 510, and a work-in-progress 512. The assembly 500 may be utilized in the food item machine assembly 400. The base module 506 may comprise one or more soft potentiometer 508.

The assembly module 502 may be attached to the one or more mods 504 and the base module 506 and contact the soft potentiometer 508. The assembly module 502 may store assembly material and receive a message to be operated to dispense the assembly material in response to receiving a message from the machine control system. The assembly module 502 may auto-calibrate to determine the operation of components to dispense the assembly material. The assembly module 502 may receive additional assembly material from the one or more mods 504. In some embodiments, the assembly module 502 may detect that the stored assembly material is below a threshold value and operate to transfer the assembly material stored in the one or more mods 504 to the assembly module 502. The assembly module 502 may contact the soft potentiometer 508 when attached to the base module 506. The assembly module 502 may send a message to a node indicating that the assembly module 502 has contacted the soft potentiometer 508. The node may determine the location of the assembly module 502 based on the message.

The one or more mods 504 may be attached to the assembly module 502, the base module 506, or another component of the assembly 500. The one or more mods 504 may be utilized for many functions, including temperature control, storing additional assembly material. The stored assembly material may be the same or different assembly material compared to the assembly material stored in the assembly module 502.

The base module 506 provides structural support for the other components. The base module 506 is attached to the assembly module 502, the soft potentiometer 508, and the conveyor module 510. The base module 506 may be attached to one or more soft potentiometer 508. The location of each soft potentiometer 508 may correspond to a location that the assembly module 502 may attached. A message may be sent to the node to determine the location of the assembly module 502. The base module 506 may also be altered to affect the location of the dispensation of the assembly material.

The soft potentiometer 508 may be a component of the base module 506 and be contacted by the assembly module 502. The soft potentiometer 508 detects pressure to indicate that an assembly module 502 is attached to the base module 506. A message is then sent to a node of the machine control system that an assembly module 502 is attached at the location of the soft potentiometer 508. The machine control system may then determine the operating space of the assembly module 502 (e.g., the assembly material in the assembly module 502 and any components with the assembly module 502). The machine control system may then send core instructions and module-specific instructions to the assembly module 502.

The conveyor module 510 is attached to the base module 506 and may contact the work-in-progress 512. The conveyor module 510 moves the work-in-progress 512 in response to messages communicated by a node. The conveyor module 510 may also contact a soft potentiometer 508 (not shown) to determine its location. The conveyor module 510 also receives core instructions and module-specific instructions from the machine control system. In some embodiments, the base module 506 comprises the conveyor module 510.

The work-in-progress 512 is a collection of one or more assembly materials. The work-in-progress 512 is moved by the conveyor module 510 and has additional assembly material added by the assembly module 502.

The assembly 500 may be adapted to be utilized in operations such as assembling food items, constructing a home, providing irrigation to crops, etc.

Figure 6:
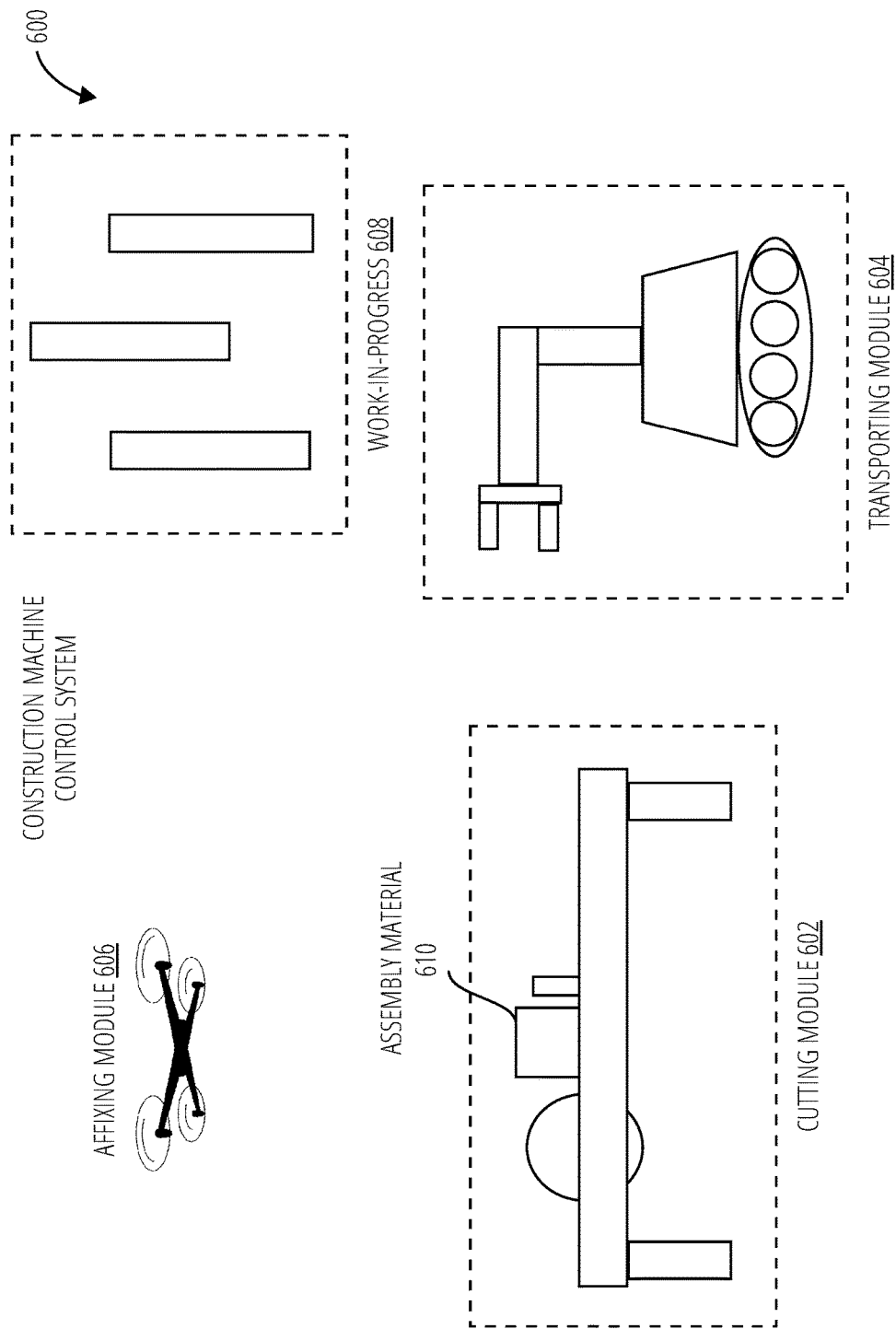
FIG. 6 illustrates an embodiment of a construction machine control system 600.

Referring to FIG. 6, the construction machine control system 600 comprises a cutting module 602, a transporting module 604, an affixing module 606, a work-in-progress 608, and an assembly material 610.

The construction machine control system 600 may operate as a machine control system. Each of the cutting module 602, the transporting module 604, and the affixing module 606 is a module in a machine control system, which is described in FIG. 3. As depicted, the system objective for the construction machine control system 600 is to assemble the frame of a house from the assembly material 610. One or more of the modules may be selected to be a node in a hierarchy of modules. For example, in one embodiment, the cutting module 602 may be a first level node that controls the operation of the other modules to complete the system objective or other task provided by the server system. This hierarchy of modules may be more efficient, for example, when the transporting module 604 is placing the assembly material 610 onto the cutting module 602. The affixing module 606 may be relatively inactive and sending status reports to the cutting module 602, while the transporting module 604 is sending the cutting module 602 messages concerning the placement of the assembly material 610. In another embodiment, the cutting module 602 may be a second level node and the transporting module 604 may be a first level node in the hierarchy of modules. In such as hierarchy of modules, the affixing module 606 would be a module "below" the transporting module 604 in the hierarchy of modules. This orientation may be more efficient when the transporting module 604 is placing the assembly material 610 into the work-in-progress 608 and the affixing module 606 is affixing the assembly material 610 to the work-in-progress 608. In such a situation, the transporting module 604 and the affixing module 606 may send many messages to each other regarding the position of the assembly material 610 relative to the work-in-progress 608. Sending these message to the cutting module 602 prior to the other module may be inefficient; thus, another node may be utilized.

The cutting module 602 may comprise a message-sending component, a message-receiving component, logic stored in a non-transitory computer-readable storage medium device to operate (e.g., in response to messages) the cutting module 602, one or more sensors, a cutting component, a material sliding component, an actuator(s) to operate the cutting component and the material sliding component, and a power source. The cutting module 602 may store configuration instructions. The cutting module 602 may also comprise structural elements. The components may be utilized to cut the assembly material 610 in response to a message from a higher order node or from the system objective if the cutting module 602 is the highest order node in the construction machine control system 600 (i.e., operates itself to alter the state of the construction machine control system 600).

The transporting module 604 may comprise a message-sending component, a message-receiving component, logic stored in a non-transitory computer-readable storage medium device to operate (e.g., in response to messages) the transporting module 604, one or more sensors, an articulating, telescopic grasping component, a translocation component, an actuator(s) to operate the articulating, telescopic grasping component and the translocation component, and a power source. The transporting module 604 may store configuration instructions. The transporting module 604 may also comprise structural elements. The components may be utilized to place the assembly material 610 in response to a message from a higher order node or from the system objective if the transporting module 604 is the highest order node in the construction machine control system 600 (i.e., operates itself to alter the state of the construction machine control system 600).

The affixing module 606 may comprise a message-sending component, a message-receiving component, logic stored in a non-transitory computer-readable storage medium device to operate (e.g., in response to messages) the affixing module 606, one or more sensors, one or more rotary components, a connecting material (not shown, e.g., a nail) ejecting component, an actuator(s) to operate the one or more rotary components and connecting material ejecting component, and a power source. The affixing module 606 may store configuration instructions. The affixing module 606 may also comprise structural elements. The components may be utilized to place the assembly material 610 in response to a message from a higher order node or from the system objective if the affixing module 606 is the highest order node in the construction machine control system 600 (i.e., operates itself to alter the state of the construction machine control system 600).

The work-in-progress 608 is a collection of one or more assembly materials. The system objective defines the final state of the work-in-progress 608. The work-in-progress 608 has additional assembly material added by the transporting module 604 and the affixing module 606.

The assembly material 610 is structural material utilized to build the work-in-progress 608. The assembly material 610 may be manipulated and altered by the cutting module 602, the transporting module 604, and the affixing module 606.

Referring to FIG. 7, the order processing method 700 receives an order (block 702). The order may be received by an on-site terminal, an application, or a website portal. The order may also be received via a point of sale system. Whether the order corresponds to a stored system objective is then determined (block 704). The system objective may be stored in a control memory structure, lookup table, etc. The order processing method 700 determines whether there was a corresponding system objective (decision block 706). If not, a response indicating no corresponding system objective is sent (block 708). The response may be sent to the on-site terminal, the application, or the web site portal that received the order. The selection of a machine control system is then bypassed. Thus, a component may perform another operation. A corrective action is then called (block 712). The corrective action may include an update to the control memory structure, displaying a notification on a machine display of an on-site terminal, an application, or a website portal, etc.

If the system objective is found, a machine control system is selected to perform the system objective (block 714). The machine control system may be selected based on the on-site terminal, the application, or the website portal utilized to send the order, the server associated with the on-site terminal, the application, or the website portal, and the capabilities and location of the machine control system. The system objective is sent to the selected machine control system (block 716). The server may have a specific module in the machine control system to which to send the system objective. The specific module may also be based on the system objective, whether another system objective is in process for that machine control system, etc. The system objective may also include a node structure for the machine control system.

Figure 8:
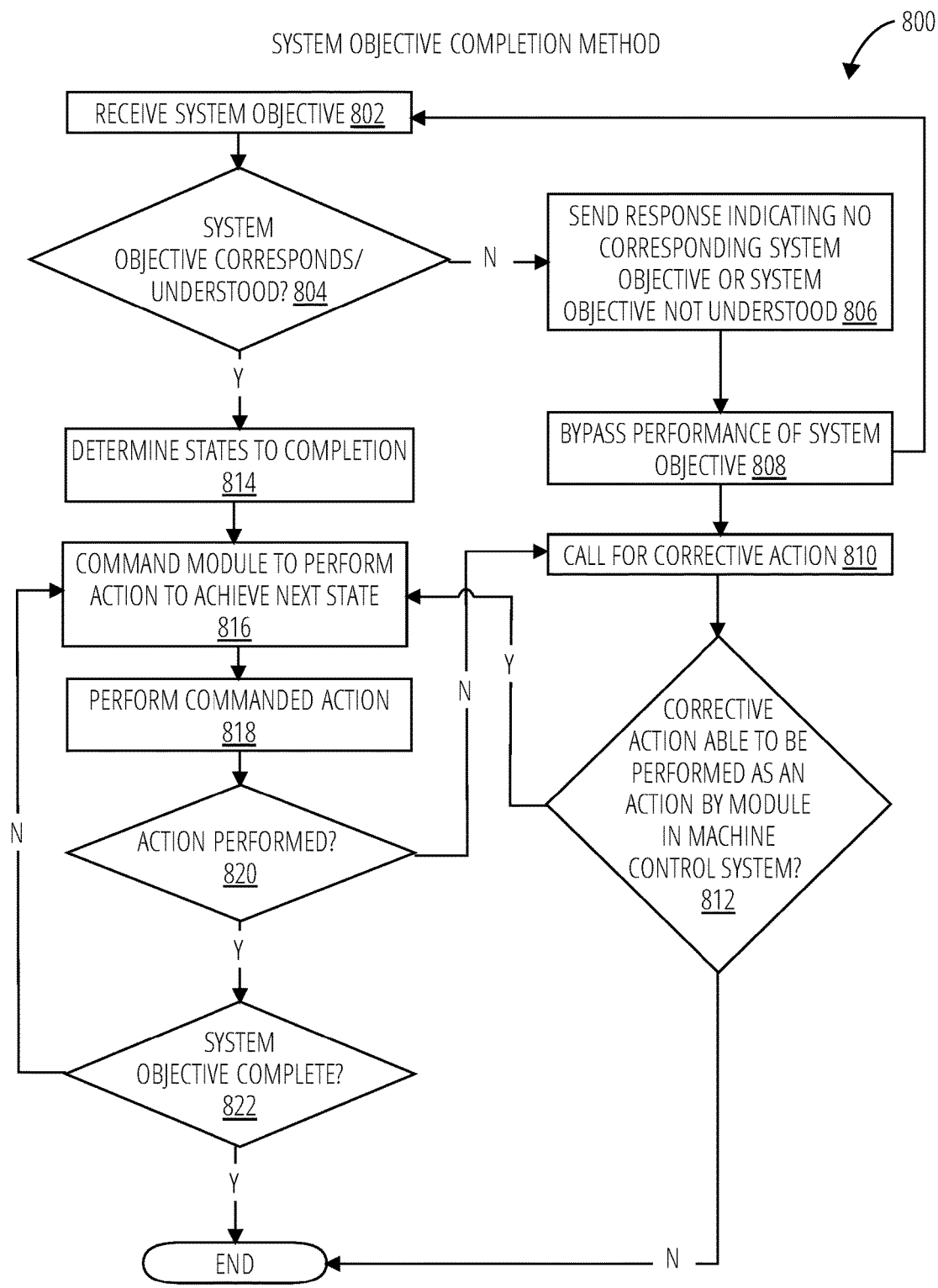
FIG. 8 illustrates an embodiment of a system objective completion method 800.

Referring to FIG. 8, the system objective completion method 800 receives a system objective (block 802). The system objective completion method 800 determines whether there is a corresponding system objective stored and whether the system objective is understood (decision block 804). The system objective may be stored as part of the configuration instructions. If not, a response is sent indicating that there is no corresponding system objective or that the system objective is not understood (block 806). The response may be a communication, such as a message, to a module or server. The performance of the system objective is then bypassed (block 808). Corrective action is then called (block 810). The corrective action may include receiving configuration instructions that include the system objective from a module or server. The system objective may also be sent to another machine control system. Corrective action may include determining whether a module has the configuration instructions to perform the action, determining whether another module may perform the action, etc. The system objective completion method 800 then determines whether the corrective action may be performed as an action by a module in the machine control system (decision block 812). The corrective action may be performed by multiple modules. If so, the module is commanded to perform the action to achieve the corrected state (block 816). If not, the system objective completion method 800 ends.

If there is a corresponding system objective and the system objective is understood, the states to completion of the system objective is determined (block 814). The system objective may determine multiple end states, each end state comprising one or more sets of actions. One of the sets of actions may be selected to be performed. The states to completion may be based on the combined operating space of the modules. The next state may be selected based on a number of factors, including the minimum number of components to activate, minimizing the number of messages sent, minimizing energy usage by the components, increasing the flexibility of the system to receive another system objective, etc. The selection of the set of actions may also be influenced by binned inputs (e.g., one or more sequences of actions) for the system objective. The binned input may be received from a server system and stored as part of the configuration instructions. A module is commanded to perform an action to achieve the next state (block 816). A message may be sent to the module to perform the action. Multiple messages may also be sent to one or more modules. The module performs the commanded action (block 818). The action may be a sequence of actions. The system objective completion method 800 then determines whether the action was performed (decision block 820). The machine control system may utilize one or more of the modules to determine whether the action was performed. If the action was not performed, the system objective completion method 800 calls for corrective action (block 810).

If the action was determined to be performed, the system objective completion method 800 determines whether the system objective is complete (decision block 822). If not, a module is commanded to perform an action to achieve the next state (block 816). If the system objective is complete, the system objective completion method 800 ends.

In some embodiments, the system objective completion method 800 may receive multiple system objectives. These may be transformed into a combined system objective. The system objective completion method 800 may determine whether or not each system objective is completed during decision block 822. The system objective completion method 800 determines the new combined system objective, if any.

Figure 9:
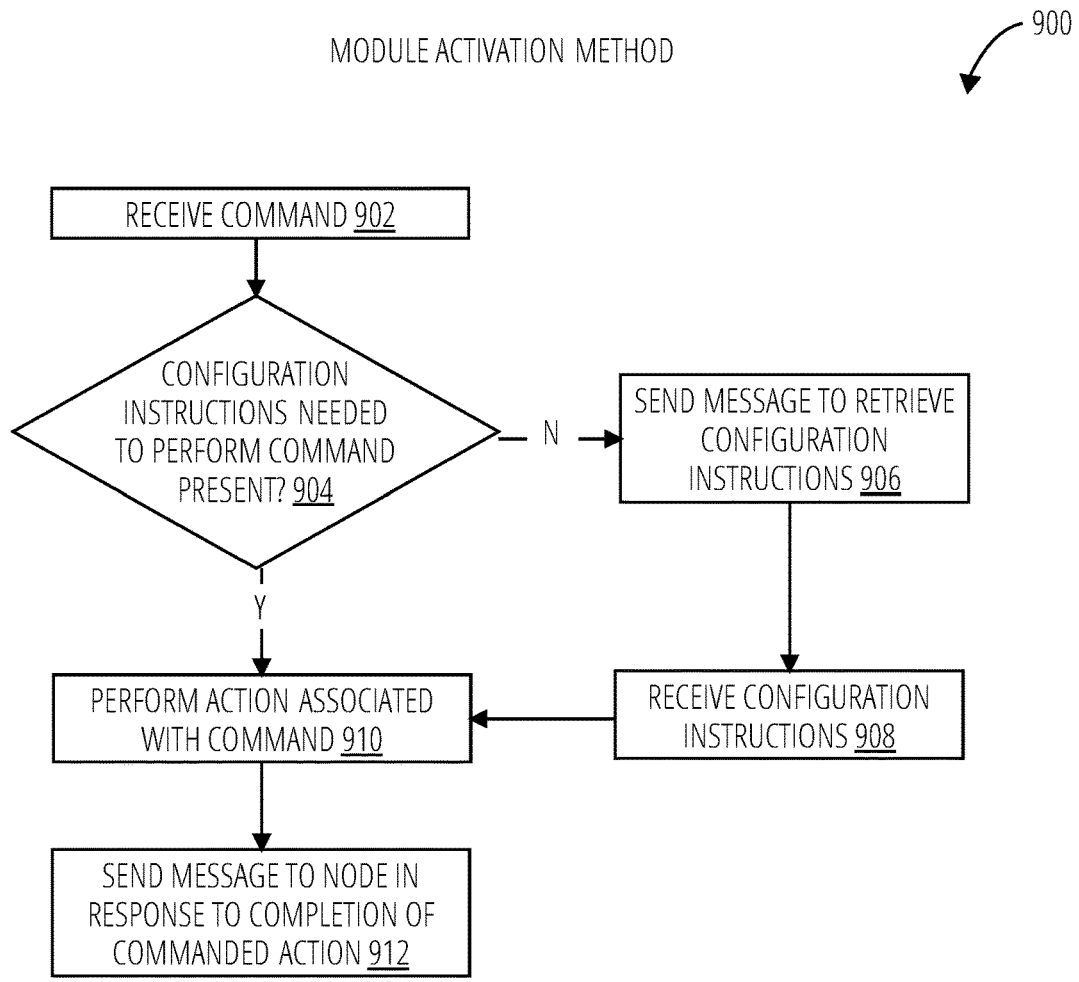
FIG. 9 illustrates an embodiment of a module activation method 900.

Referring to FIG. 9, the module activation method 900 receives a command (block 902). The command may be a message or other communication received from a node or a server system. The module activation method 900 then determines whether configuration instructions to perform the command are present to transform the command into an action (decision block 904). The configuration instructions may comprise module-specific instructions embodied as logic stored on a module. If not, a message is sent to retrieve the configuration instructions (block 906). The message may be sent to the module (node) from which the originating command was received. The message may also be sent to the server system. The configuration instructions are then received (block 908). The configuration instructions may be received from the server system, the node, or other modules in the machine control system. If the configuration instructions are present or once received, the module performs the action associated with the command (block 910). Multiple components may be activated in parallel, in series, or a combination thereof. The module then sends a message to the node in response to the completion of the action (block 912). The module may perform additional actions, such as utilizing a sensor to determine whether the action was successfully executed, prior to sending the message. The module may also send metadata associated with the performance of the action to a server, node, or module. The module may embed the metadata with the message sent to the node. The metadata may include how long the action took to perform, how much energy was required to perform the action, etc.

Figure 10:
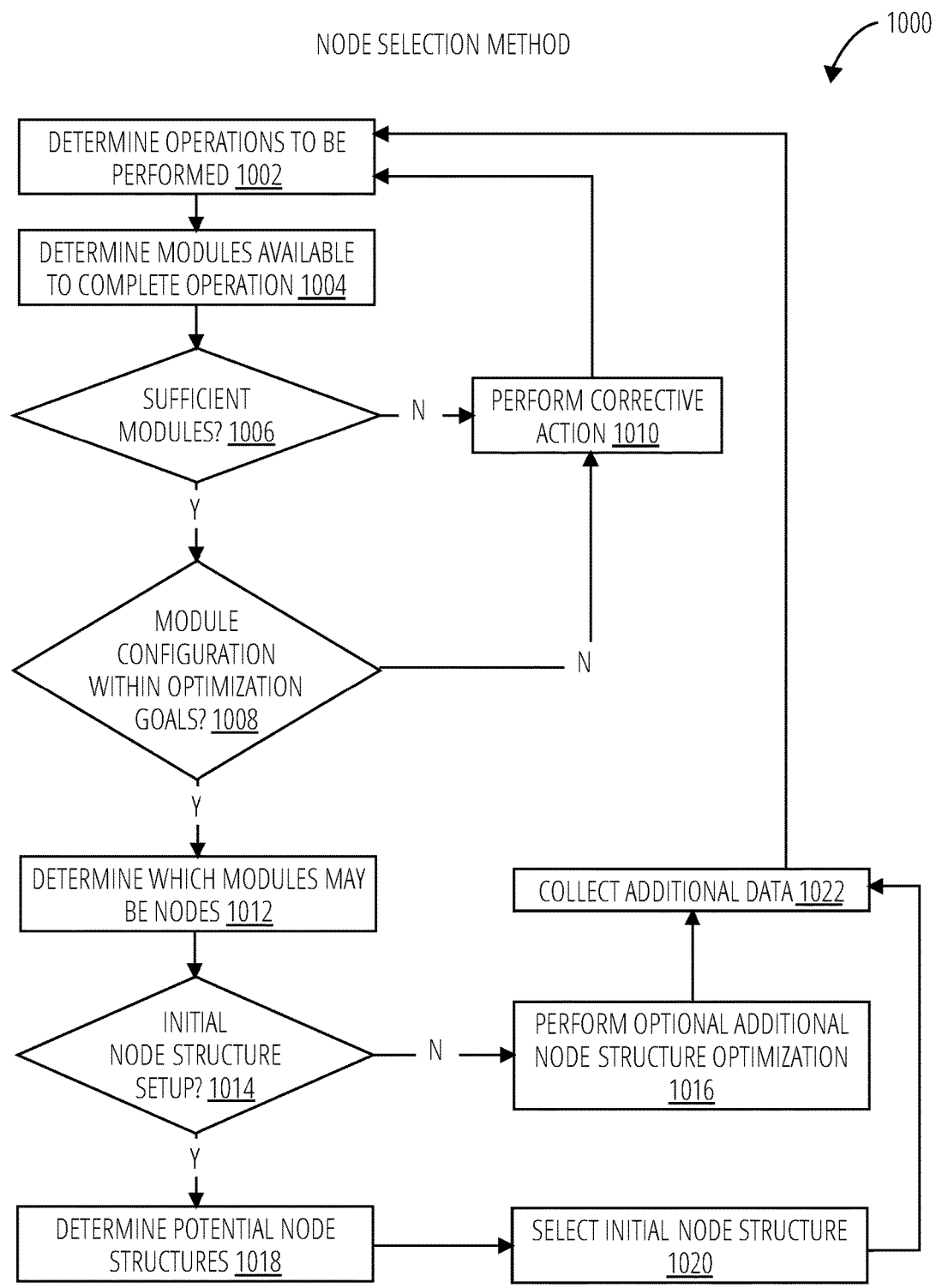
FIG. 10 illustrates an embodiment of a node selection method 1000.

Referring to FIG. 10, the node selection method 1000 determines the operations to be performed by the machine control system (block 1002). The operations may include system objectives, calibrations, error-checking etc. The modules to complete the operation are then determined (block 1004). Modules not utilized for the operation may be excluded from the group of potential nodes to optimize communications, communication channels, power utilization, etc.

The node selection method 1000 then determines whether there are sufficient modules to perform the operations (decision block 1006). If so, the node selection method 1000 determines whether the module configuration is within optimization goals (decision block 1008). The optimization goals may be received from a server, node, or module. The optimization goals may be stored as configuration instructions. If not or there are not sufficient modules, corrective action is performed (block 1010). The operation may be sent to another group of modules, a request for an additional module(s) may be sent to a server, module, or node, etc. One corrective action is performed, the node selection method 1000 may return to the block 1002.

If the module configuration is within optimization goals, the modules which may act as nodes are determined from the group of modules to complete the operation (block 1012). The node selection method 1000 determines whether initial node structure setup is being performed (decision block 1014). If not, optional, additional node structure optimization may be performed (block 1016). The node structure may be selected to optimize communications, communication channels, power utilization, etc.

If initial node structure setup is being performed, the potential nodes structures are determined (block 1018). A node structure may be a hierarchy of modules with at least one first level node and each other module communicating with the node. An initial node structure is then selected (block 1020). The node structure may be selected to optimize communications, communication channels, power utilization, etc.

Once additional node structure optimization or initial node selection is performed, additional data is collected (block 1022). The additional data may be gathered from the operation of multiple machine control systems, including the machine control system configured by the node selection method 1000. Data from the operations performed by machine control systems other than the machine control system configured by the node selection method 1000 may be collected. The data may be utilized to determine optimization goals. The node selection method 1000 may then return to the block 1002.

In some embodiments, node structures may be stored and activated in response to specific operations. For an operation, multiple node structures may be utilized throughout the operation.

Figure 11:
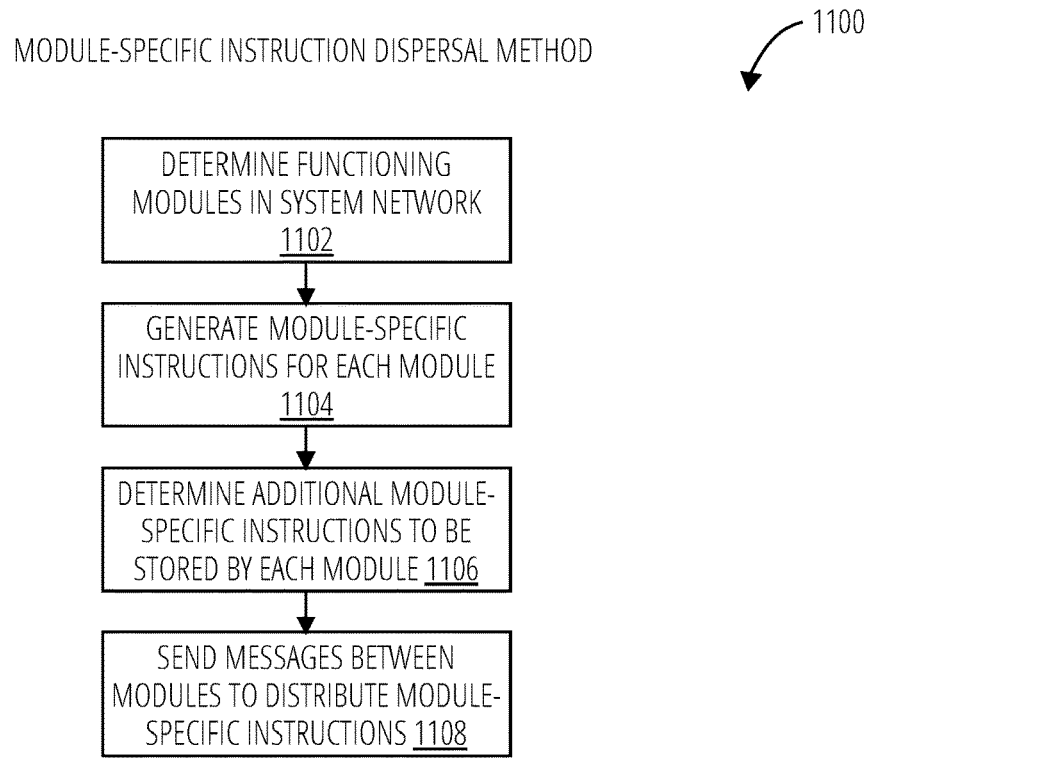
FIG. 11 illustrates an embodiment of a module-specific instruction dispersal method 1100.

Referring to FIG. 11, the module-specific instruction dispersal method 1100 determines the functioning modules in the machine control system (block 1102). A functioning module is a module that is able to perform the tasks associated with its configuration instructions. The module-specific instructions are generated for each module in the machine control system (block 1104). The additional module-specific instructions to be stored by each module are determined (block 1106). The additional module-specific instructions are module-specific instructions utilized by other modules. The determination may be based on a number of factors, including the number of modules, the likelihood of an additional module being added, and the failure rate of each of the modules. Messages are then sent between modules to distribute the module-specific instructions (block 1108).

In some embodiments, collaborative information or operating information generated by each module, including lookup tables, status, etc. may also be dispersed among the modules of the machine control system along with the module-specific instructions utilizing a similar method. However, the actual dispersion may differ.

Figure 12:
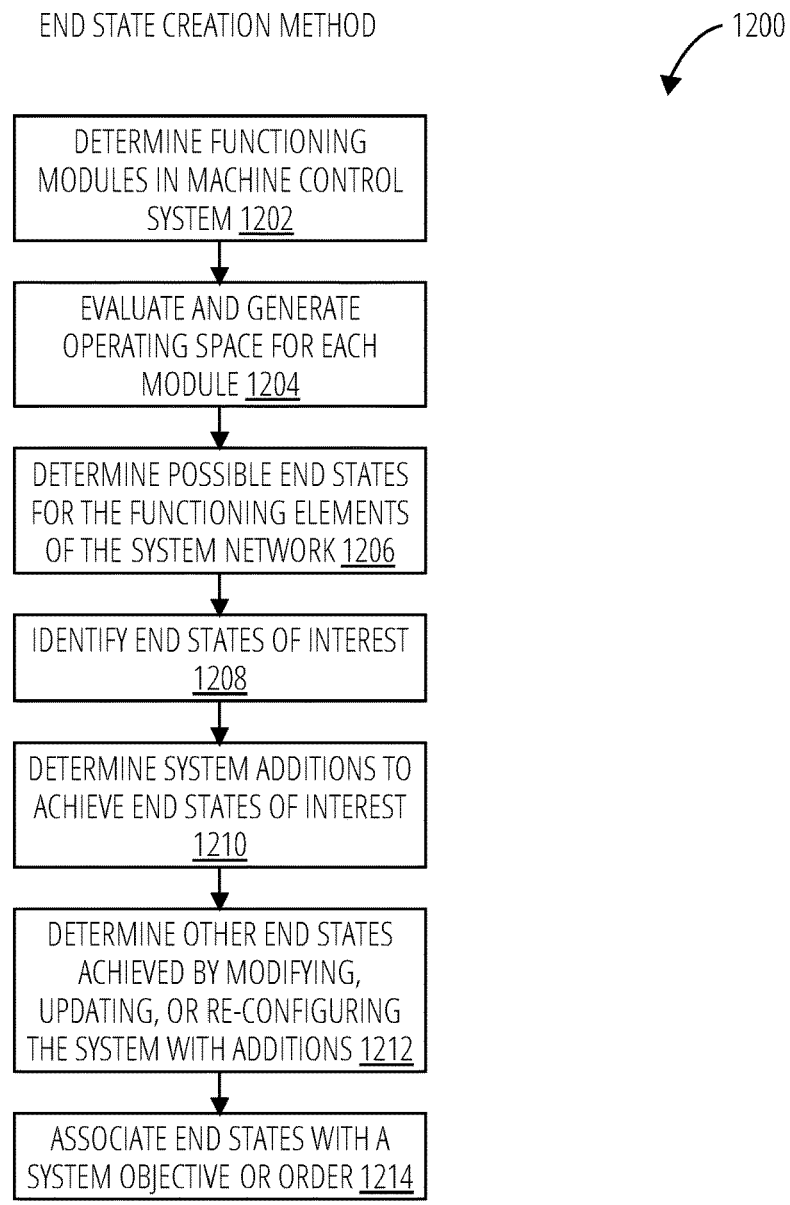
FIG. 12 illustrates an embodiment of an end state creation method 1200.

Referring to FIG. 12, the end state creation method 1200 determines the functioning modules in a machine control system (block 1202). The operating space is evaluated and generated for each module in the machine control system (block 1204). The operating space may be a list of the actions that may be performed by the components of the module. The actions result in end states. An end state is the resulting work-in-progress from at least one operation of a module. An end state may result from modules operating in series or parallel. The possible end states are determined for the functioning elements of the system network (block 1206). The possible end states may result from additional software update, modification, reconfiguration, etc. End states of interest are identified (block 1208). The end states may be selected by similarity to current end states, as a result of an input associated with the end state, by a pre-determined criteria (e.g., those beginning with an operation A and ending with an operation B), etc. System additions to achieve the end states of interest are determined (block 1210). Other end states that may be achieved by modifying, updating, or re-configuring the system with additions are determined (block 1212). The end states are then associated with a system objective or order (block 1214).

In some embodiments, multiple sequences of module operations result in a selected end state. Each sequence may be stored. Alternatively, the sequences may be selected based on criteria such as number of operations, number of communications (e.g., messages) to complete, communication channels, energy expenditure, etc.

The pre-determined orders may be sent to a device configured to receive an input selecting an order, such as an on-site terminal, an application on a device, or a website portal.

Figure 13:
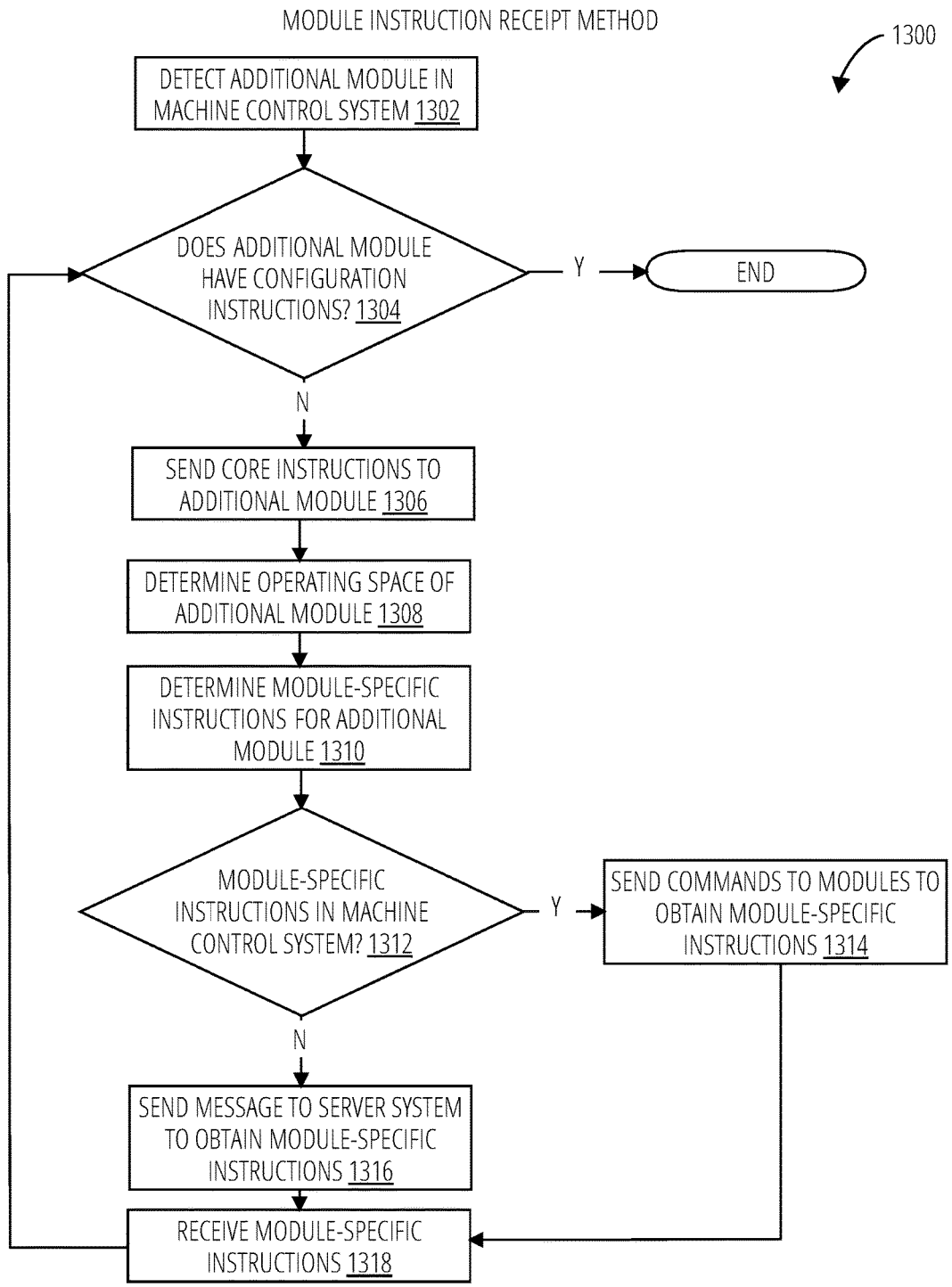
FIG. 13 illustrates an embodiment of a module instruction receipt method 1300.

Referring to FIG. 13, the module instruction receipt method 1300 detects an additional module in a machine control system (block 1302). The additional module may be a replacement for another module or may be a module added to the machine control system. The detection may be made by a sensor component of a module (such as a node) in the machine control system. The additional module may also have instruction to broadcast its presence or to receive a broadcast from another module for additional modules. The module instruction receipt method 1300 then determines whether the additional module has configuration instructions to operate in the machine control system (decision block 1304). A message may be sent to the additional module from another module in the machine control system, such as a module acting as a node. The additional module may respond to the message or not receiving a response from the additional module within a pre-determined time period may indicate an absence of configuration instructions. If the additional module has configuration instructions, the module instruction receipt method 1300 ends. The new module may have configuration instructions pre-loaded and stored in a non-transitory computer-readable storage medium device that may be accessed to operate per those configuration instructions.

If the additional module does not have configuration instructions, the core instructions for the machine control system are sent to the new module (block 1306). The core instructions may be sent by the module acting as a node communicating with the new module, another module, or a server. The operating space of the additional module is then determined (block 1308). The operating space may be a list of the actions that may be performed by the components of the module. The module-specific instructions for the additional module are then determined (block 1310). The module-specific instructions may be utilized by a module to, for example, operate its components in response to a message or command from another module, such as a node. The module instruction receipt method 1300 then determines whether module-specific instructions are located in the machine control system (decision block 1312). The machine control system may have utilized the module-specific instruction dispersal method 1100 describe in FIG. 11 to distribute module-specific instructions for each module in the machine control system (for a replacement module) and modules that may potentially be added to the machine control system (for an added module). In addition, an additional module may have similar components to the existing modules such that the module-specific instructions may be a combination of those module-specific instructions for other modules in the machine control system. If the module-specific instructions are located in the machine control system, commands are sent to those modules storing the module-specific instructions (block 1314). The commands may instruct the modules to send the module-specific instructions for the additional module to the additional module. The commands may provide instruction to utilize a node. In addition, as multiple sets of modules may comprise the module-specific instructions, the modules may be selected to send the module-specific instructions based on the number of messages to assemble the module-specific instructions, the number of communication channels, the power utilized to send the messages, etc.

If the module-specific instructions are not located in the machine control system, a message is sent to the server system to obtain the module-specific instructions (block 1316). The module-specific instructions are then received (block 1318). The module-specific instructions may be received from the server system or from other modules in the machine control system. The module instruction receipt method 1300 may then determine whether the additional module has the configuration instructions.

In some embodiments, core instructions are sent to the additional module in response to detecting the additional module.

Figure 14:
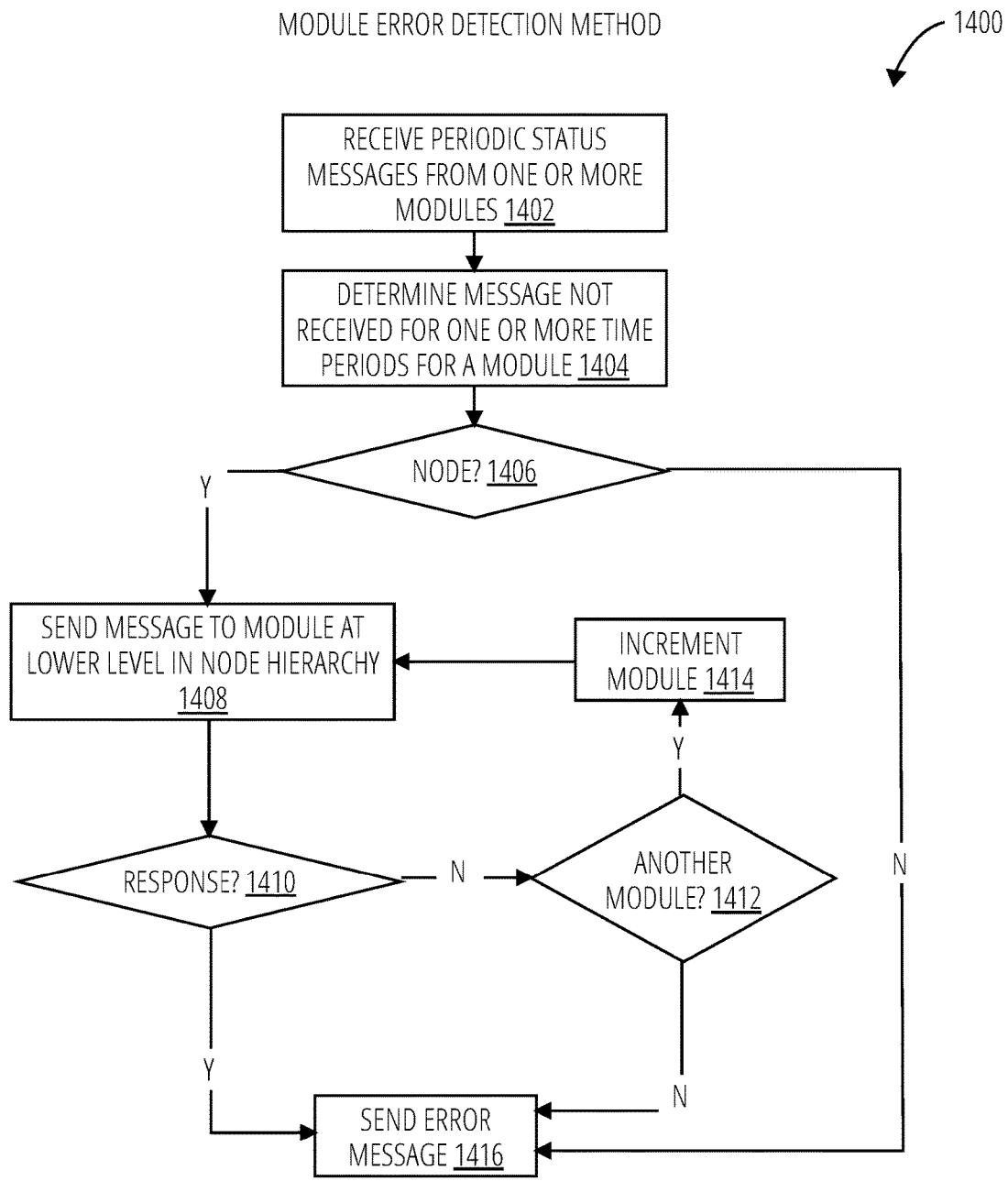
FIG. 14 illustrates an embodiment of a module error detection method 1400.

Referring to FIG. 14, the module error detection method 1400 receives periodic status messages from one or more modules (block 1402). The status message may be in response to a periodic status request message or an initial message requesting periodic status messages. A message received during the operation of the module may be utilized as a status message in addition to periodic status messages. The operational messagemay be utilized at a greater frequency during operation compared to a "rest" state of the system. A message is then determined not to be received (block 1404). The amount of time between when a status request signal is sent and a status message is not received may be pre-determined. The time period from when a periodic status message based on an initial message is expected to be received and when a status message is not received may also be pre-determined. The module error detection method 1400 determines whether the module from which a message is not being received is a node (decision block 1406).

If the module is a node, then a message is sent to a module at a lower level in the hierarchy of modules (block 1408). The module may be selected from a group of modules that would send message to the node. The module error detection method 1400 then determines if a response is received (decision block 1410). If a response is not received, the module error detection method 1400 determines whether there is another module in the hierarchy of modules "below" the node (decision block 1412). If so, the module is incremented and a message sent to the current module (block 1414).

If the module is not a node, a response is received from the module "below" the node in the hierarchy of modules, or if there is not another module "below" the node in the hierarchy of modules, an error message is sent to the server system (block 1416). The error message may include each module for which a status message or response message is not received. The error message may also be sent to a control application device associated with the module.

In some embodiments, if a node is determined to have an error, the node selection method 1000 is then utilized to select a new node based on the remaining modules. If a response was received from a module in the hierarchy of modules "below" the node with an error, that module may be selected as the new node, if capable, or may be weighted during the node selection process to be the new node.

In response to the error message, the server system may initiate a process to replace the module. The server system may also store the error message, which may be utilized to determine whether the error is systematic or isolated by a machine learning component.

Figure 15:
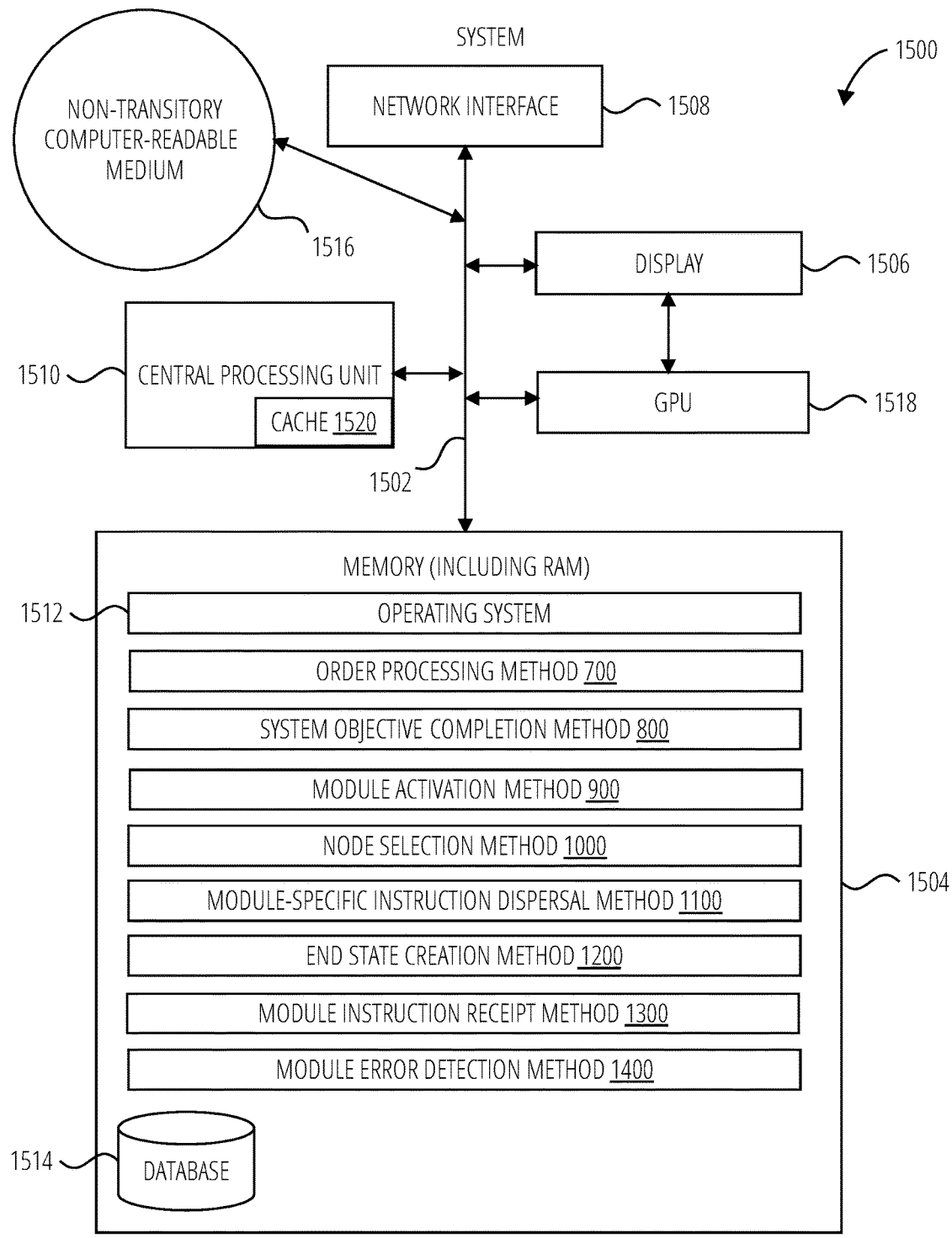
FIG. 15 illustrates a system 1500 in accordance with one embodiment.

FIG. 15 illustrates several components of an exemplary system 1500 in accordance with one embodiment. In various embodiments, system 1500 may include a desktop PC, server, workstation, mobile phone, laptop, tablet, set-top box, appliance, or other computing device that is capable of performing operations such as those described herein. In some embodiments, system 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1500 may comprise one or more physical and/or logical devices that collectively provide the functionalities described herein. In some embodiments, system 1500 may comprise one or more replicated and/or distributed physical or logical devices.

In some embodiments, system 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1500 includes a bus 1502 interconnecting several components including a network interface 1508, a display 1506, a central processing unit 1510, a memory 1504, and a graphics processing unit 1518. The central processing unit 1510 may further comprise a cache 1520, which may be a hardware or software component that stores data so future requests for that data may be served faster; the data stored in a cache may be the result of an earlier computation, or the duplicate of data stored elsewhere.

The graphics processing unit 1518 may be a specialized electronic circuit designed to rapidly manipulate and alter memory to accelerate the creation of images in a frame buffer, which may be intended for output to a display device. The graphics processing unit 1518 may be efficient at manipulating computer graphics and image processing, and comprise a parallel structure that makes them more efficient than general-purpose CPUs for algorithms where the processing of large blocks of data is done in parallel. The graphics processing unit 1518 may directly communicate with the display 1506.

Memory 1504 generally comprises a random access memory ("RAM") and permanent non-transitory mass storage device, such as a hard disk drive or solid-state drive. Memory 1504 stores an operating system 1512.

These and other software components may be loaded into memory 1504 of system 1500 using a drive mechanism (not shown) associated with a non-transitory computer-readable medium 1516, such as a DVD/CD-ROM drive, memory card, network download, or the like.

Memory 1504 also includes database 1514. In some embodiments, system 1500 may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Action" in this context refers to an operation, or sequence of operations, of a module as defined by the instructions stored on the module. E.g., operate an actuator for a period of time, operate a sensor, select a module and send a message to that module, send a status report to a node comprised in a message, etc. An action may alter a module and group of modules from one state to another state.

"Core instructions" in this context refers to instructions common to each module in a machine control system operating to perform a system objective input.

"End state" in this context refers to a sequence of actions, in series or parallel, performed by a group of modules to generate an output from a system objective.

"Hierarchy of modules" in this context refers to a group of modules having at least one node to which the other modules send messages. The hierarchy of modules may have more than one node with one node controlling the group of module, at least indirectly via the other nodes. Modules may be "above" or "below" another module in the hierarchy of modules. A module is "above" another module if the module is along the communication path between the other module and the highest order node or server system. A module is "below" another module if the other module is along the communication path to the highest order node or server system.

"Configuration instructions" in this context refers to instructions utilized to perform a response to an input, such as a message, sensor input, etc. The configuration instructions comprise the core instructions and the module-specific instructions. When the core instructions and the module-specific instructions are combined with a message, such as a command, an action may be performed.

"Message" in this context refers to a discrete unit of communication intended by the source for consumption by some recipient or group of recipients. An example of a message is a command, whereby one module or server sends a command for another module to operate in a specific way. The other module may then operate in that specific way in response. The messages, or communications, may be server-to-server, server-to-module, module-to-server, or module-to-module.

"Module" refers to a machine actor.

"Electro-mechanical" in this context refers to a physical response made to electrical stimuli (electrical stimuli including wireless stimuli converted to electrical signals). The physical response may be mechanical, thermal, optical, or other transducer effect to the electrical stimuli.

"Module-specific instructions" in this context refers to instructions that may or may not be common to all modules in a group of modules. These instructions may be utilized to, for example, operate an actuator or other component in response to receiving a message.

"Node" in this context refers to a module in the hierarchy of modules that controls the operation of one or more modules. A node may control or be controlled by another node.

"one or more components" in this context refers to motor controllers, power receivers, power supplies, sensors, actuators, transducers, communication receivers, communication transmitters, antennas, amplifiers, etc.

"One or more modules" in this context refers to machines utilized to generate an output from a machine objective input.

"One or more sequences of actions" in this context refers to actions (performed in series or parallel by modules) that result in the output specified by the system objective input. For example, a module may have a first actuator that moves an object forwards 4 inches and backwards 4 inches and a second actuator that moves an object left 4 inches and right 4 inches. To move an object forwards 4 inches and left 4 inches multiple sequences of actions may be utilized, such as "actuate first actuator forward; actuate second actuator left", or "actuate second actuator right; actuate second actuator left; actuate second actuator left, actuate first actuator forward".

"Operating information" in this context refers to data arrays regarding operation of components of a module. Operation information may be stored in a lookup table.

"Operating space" in this context refers to one or more actions of a module in sequence or in parallel.

"Request" in this context refers to a message sent to a server system for instructions.

"Server system" in this context refers to a computer program(s) or a device(s) that provides functionality for other programs or devices, called "clients".

"System objective" in this context refers to an electronic signal input utilized by modules to produce an output.

"Websocket protocols" in this context refers to a computer communications protocol, providing full-duplex communication channels over a single TCP connection.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A machine control system comprising:
a plurality of electro-mechanical modules, each electro-mechanical module comprising one or more electro-mechanical components positioned to manipulate work materials in an operating space, each of the electro-mechanical modules comprising:
a non-transitory computer-readable storage medium to store configuration instructions; and
the electro-mechanical components operated by the configuration instructions, the electro-mechanical components and the configuration instructions defining the operating space, wherein the configuration instructions comprise core instructions and module-specific instructions, and wherein the core instructions are stored in the non-transitory computer-readable storage medium of each of the electro-mechanical modules, and the module-specific instructions are stored only in the non-transitory computer-readable storage medium of the electro-mechanical modules having the electro-mechanical components to which the module-specific instructions apply;

logic distributed among the electro-mechanical modules to utilize spatial awareness sensors to form an algorithm to orient the electro-mechanical modules into a hierarchy of modules in response to receiving a first system objective from a source external to the electro-mechanical modules in the hierarchy of modules, the system objective comprising a physical transformation of the work materials, wherein orienting into the hierarchy of modules is based on optimizing communication channels and a number of messages to perform the system objective, and to cause the hierarchy of modules to operate to produce an output based on the first system objective by repeating the steps of:

determining a combined operating space from the operating space of each of the electro-mechanical modules in the hierarchy of modules; from the configuration instructions within each of the electro-mechanical modules, the combined operating space comprising a plurality of actions;

selecting a particular action from the plurality of actions stored within each electro-mechanical module operating as a node;

sending a message to one or more of the electro-mechanical modules to perform the action; and performing the action by activating the electro-mechanical components per the configuration instructions;

logic to cause the hierarchy of modules to operate in response to receipt of a second system objective from a source external to the electro-mechanical modules in the hierarchy of modules, after receipt of the first system objective, by generating a combined system objective from the first system objective and the second system objective, and by selecting the particular action based on the combined system objective.

2. The machine control system of claim 1, wherein the electro-mechanical modules utilize websocket protocols to communicate the message.

3. The machine control system of claim 1, wherein the module-specific instructions are distributed based on a number of the electro-mechanical modules, a likelihood of an additional module being added to the machine control system, or a failure rate of each of the electro-mechanical modules.

4. The machine control system of claim 1, wherein the machine control system is configured to communicate with a server system, the machine control system receiving the system objective from the server system.

5. The machine control system of claim 4, wherein one or more of the electro-mechanical modules send a request to the server system, the request comprising instructions to send additional configuration instructions for an additional module in response to the additional module being detected by the machine control system, the additional configuration instructions distributed among the non-transitory computer-readable storage medium of the one or more electro-mechanical modules sending the request.

6. The machine control system of claim 5, wherein the electro-mechanical modules each receive the additional configuration instructions from the server system.

7. The machine control system of claim 4, wherein the electro-mechanical modules store operating information in the non-transitory computer-readable storage medium, the operating information sent to the server system.

8. The machine control system of claim 7, wherein the operating information is distributed to the electro-mechanical modules.

9. The machine control system of claim 8, wherein distributing the operating information is based on a number of the electro-mechanical modules, a likelihood of an additional module being added to the machine control system, or a failure rate of each of the electro-mechanical modules.

10. The machine control system of claim 1, wherein the electro-mechanical modules send the configuration instructions to an additional module in response to the additional module being detected by the machine control system, the configuration instructions distributed among the non-transitory computer-readable storage medium of the electro-mechanical modules.

* * * * *